No. 689,946. Patented Dec. 31, 1901.
A. M. BEAM & H. S. BAILEY.
ORE TREATING FURNACE.
(Application filed July 17, 1899.)
(No Model.) 15 Sheets—Sheet 10.
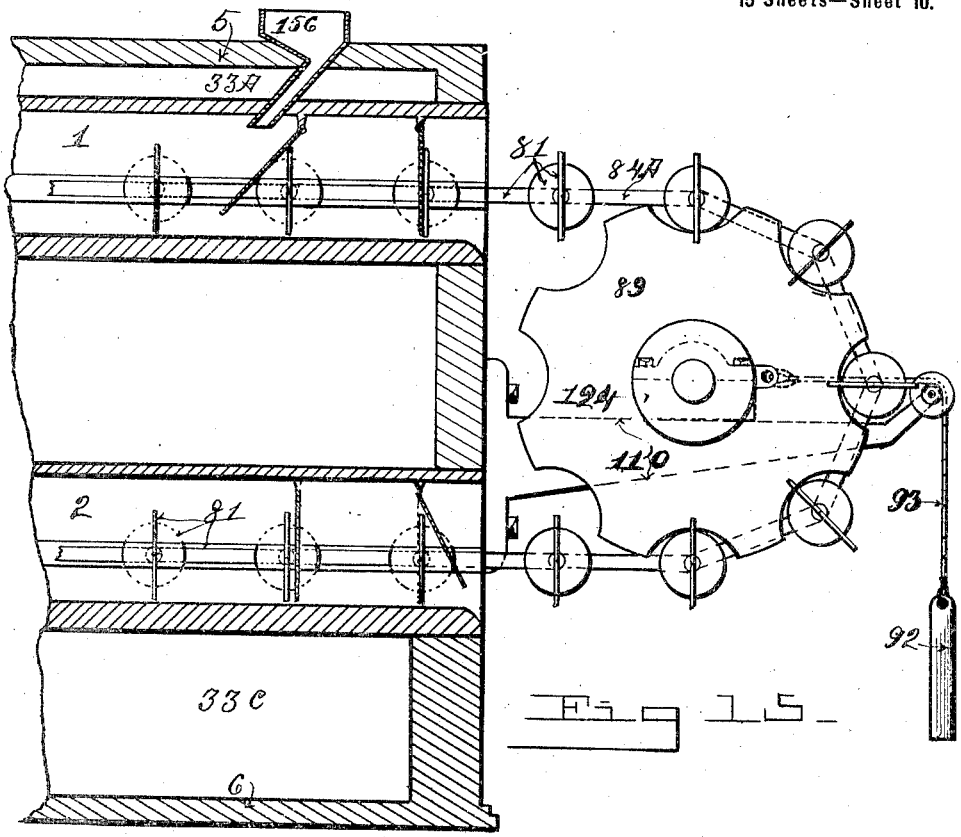
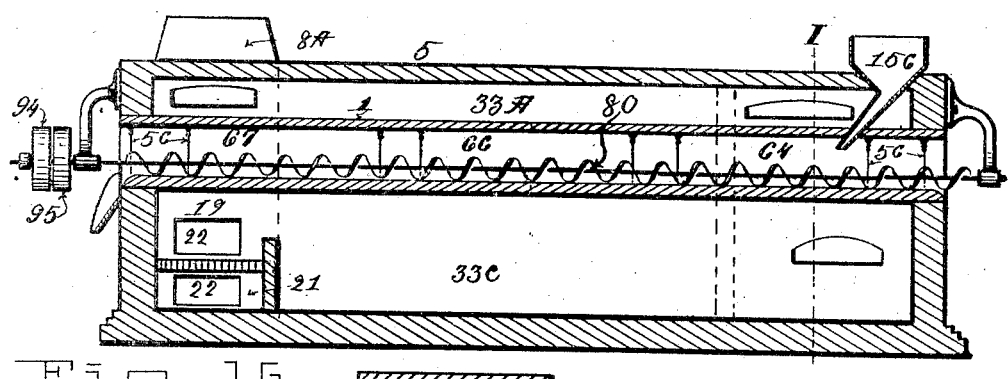
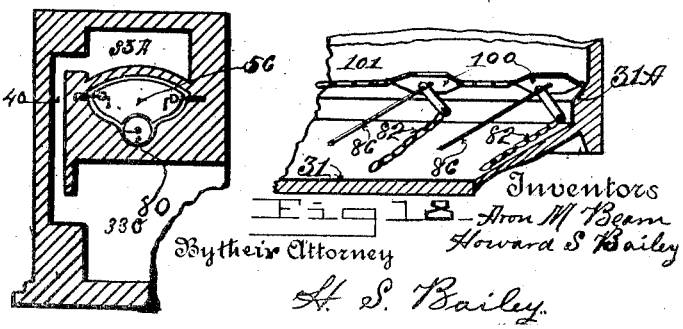
Witnesses
Walter H. Blanchard
Jesse W. Beam
Inventors
Aron M. Beam
Howard S. Bailey
By their Attorney
H. S. Bailey.

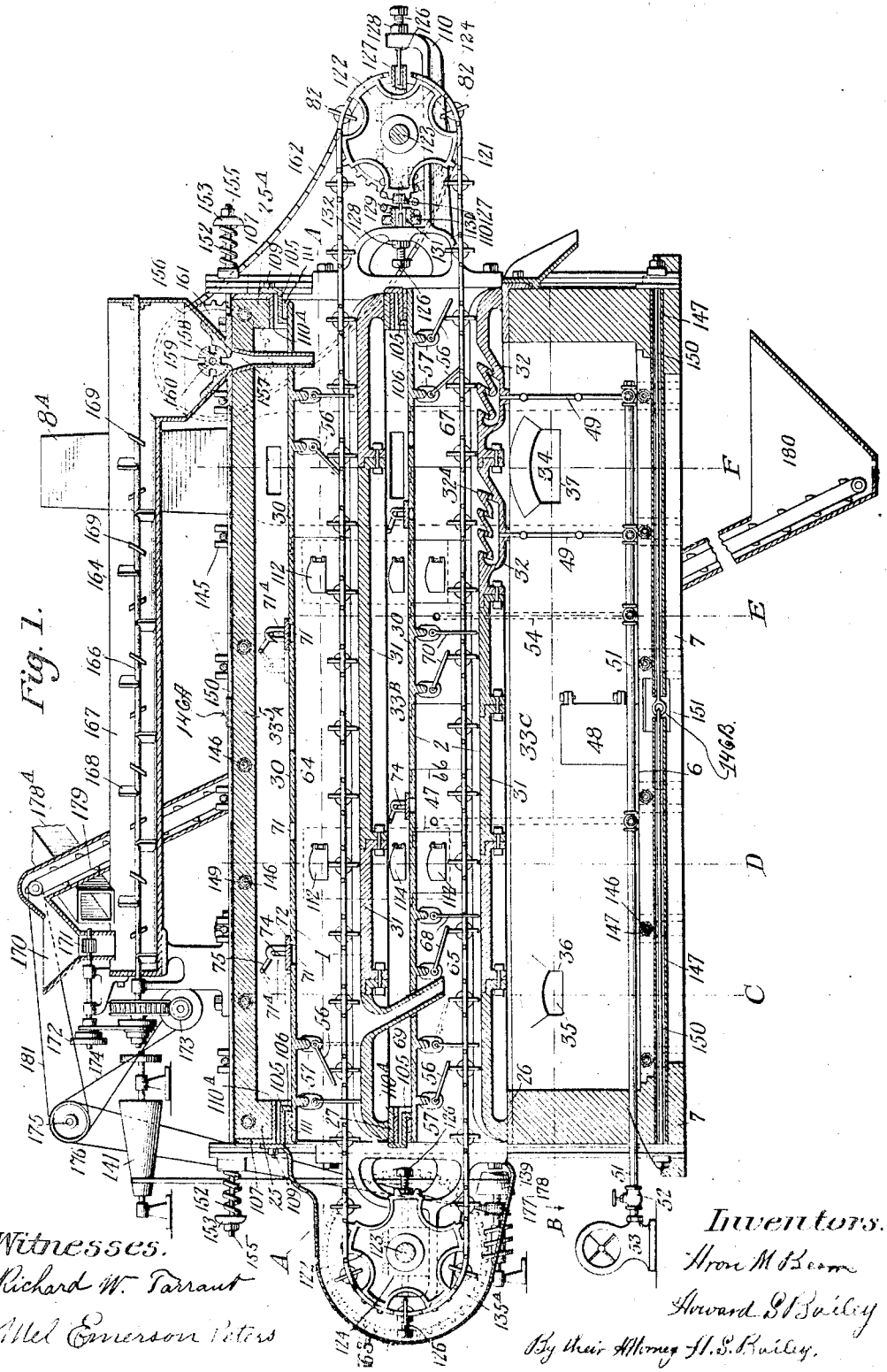

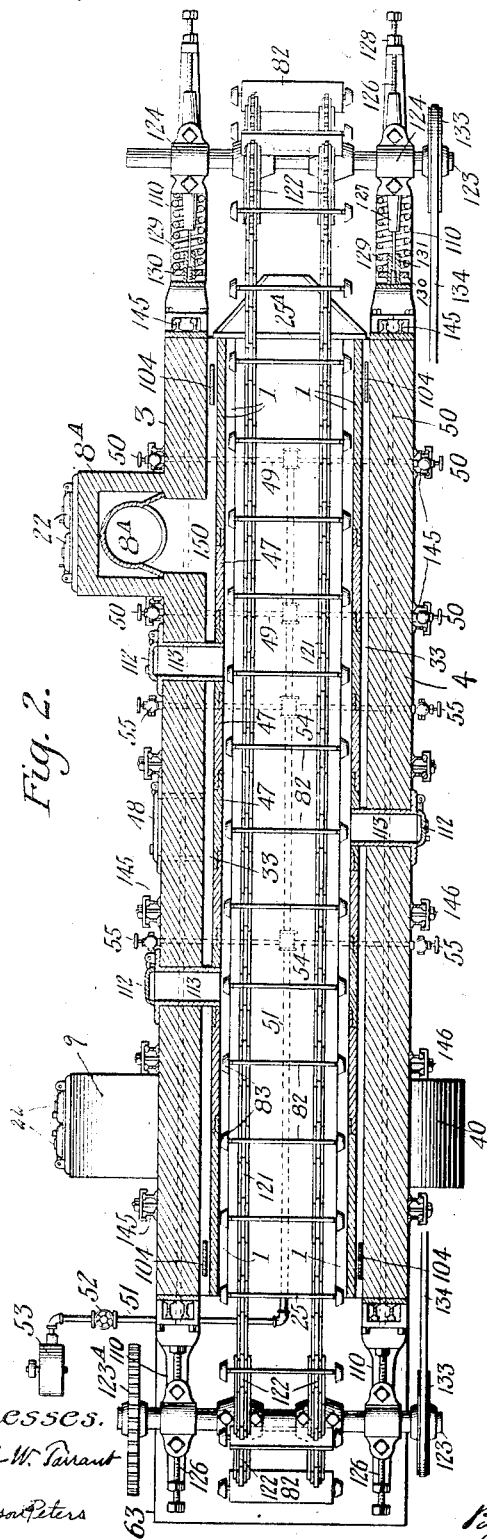

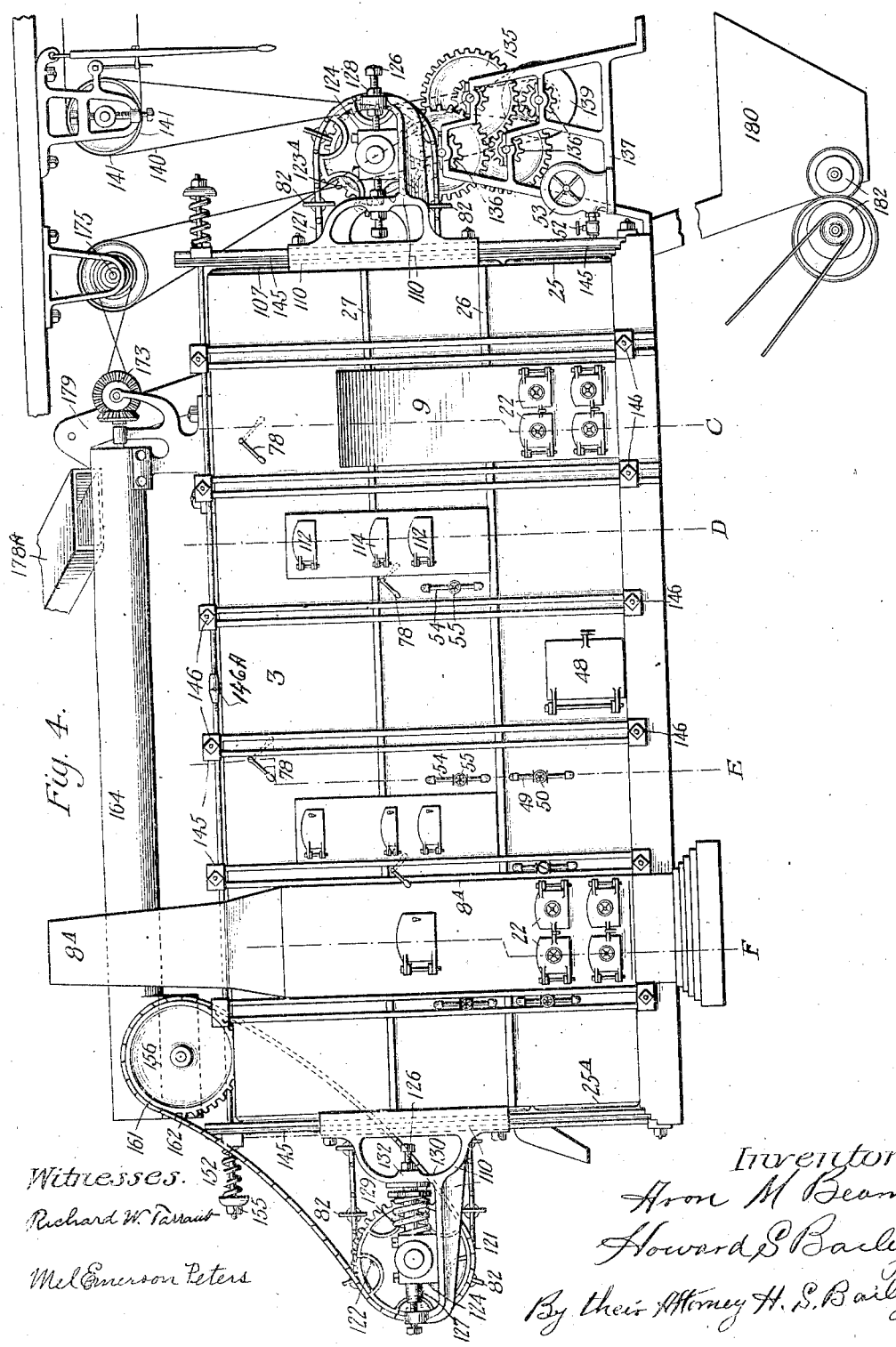

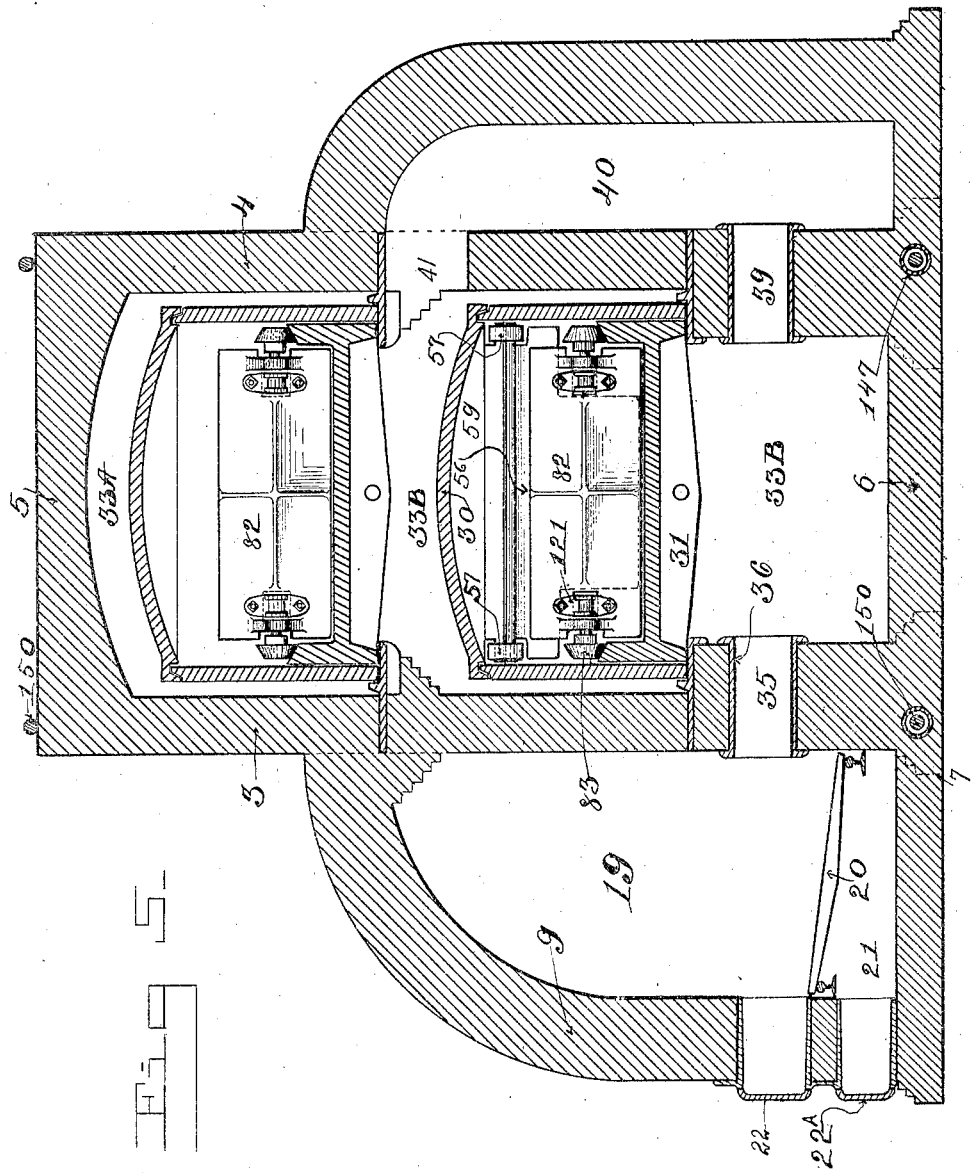

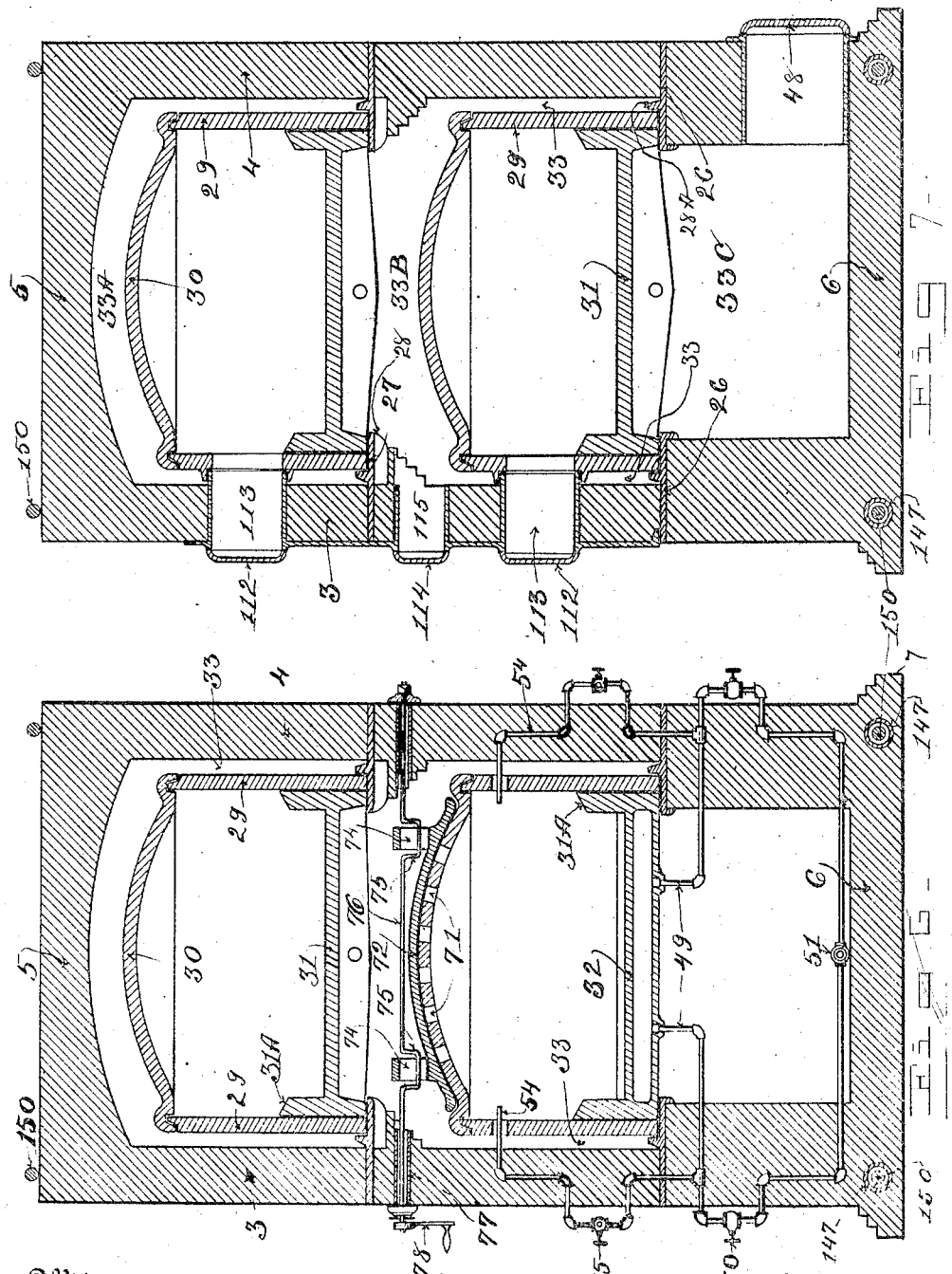

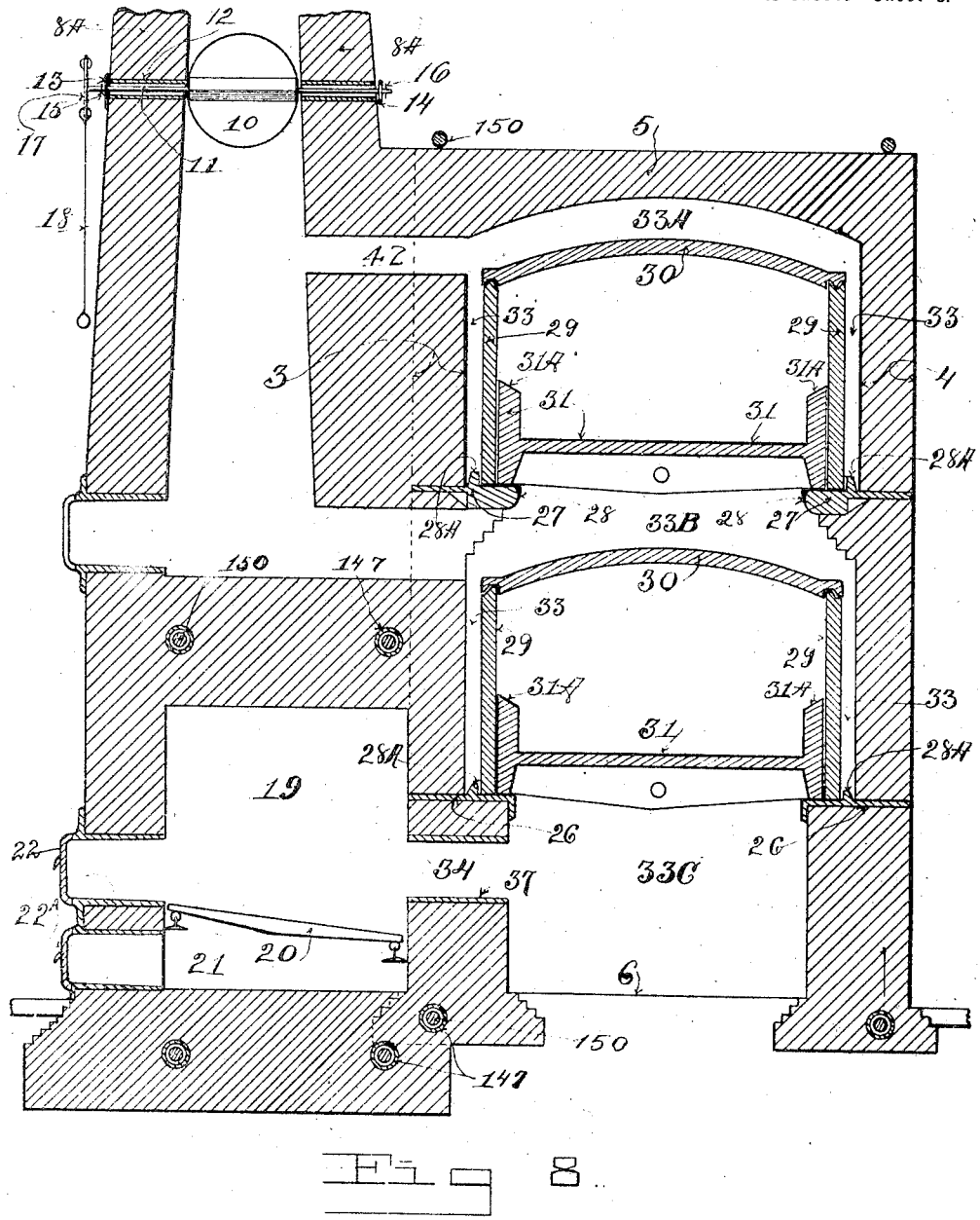

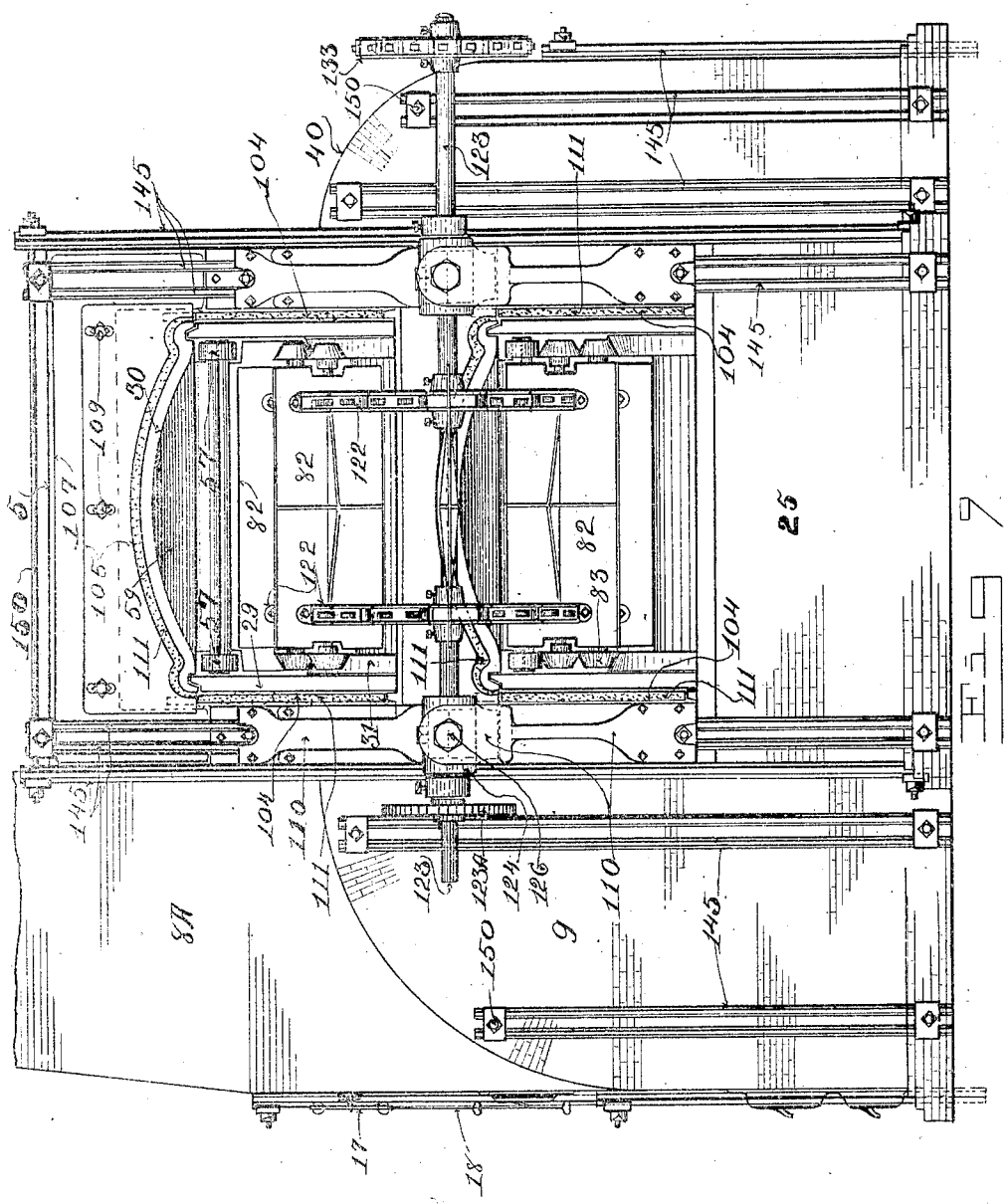

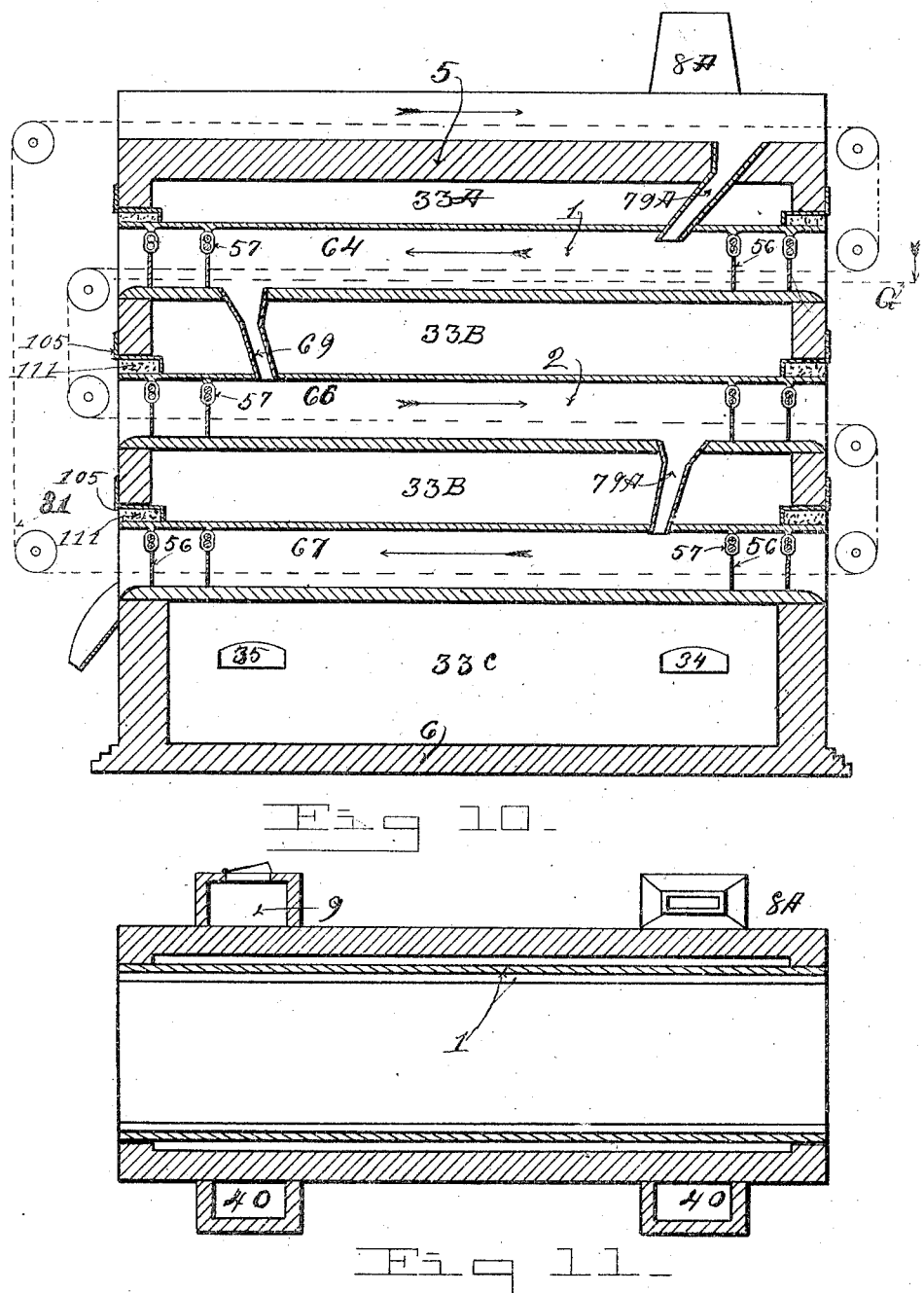

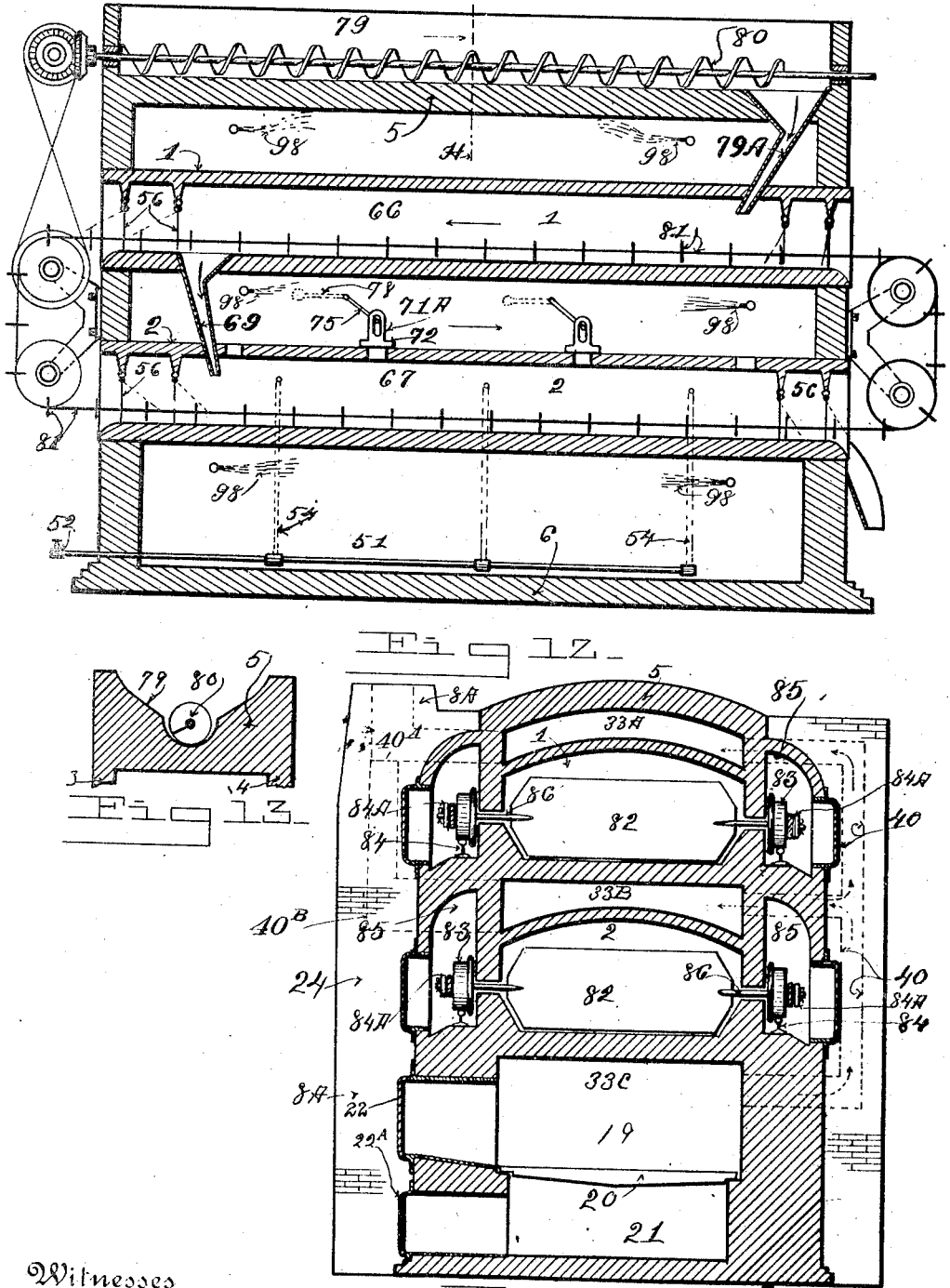

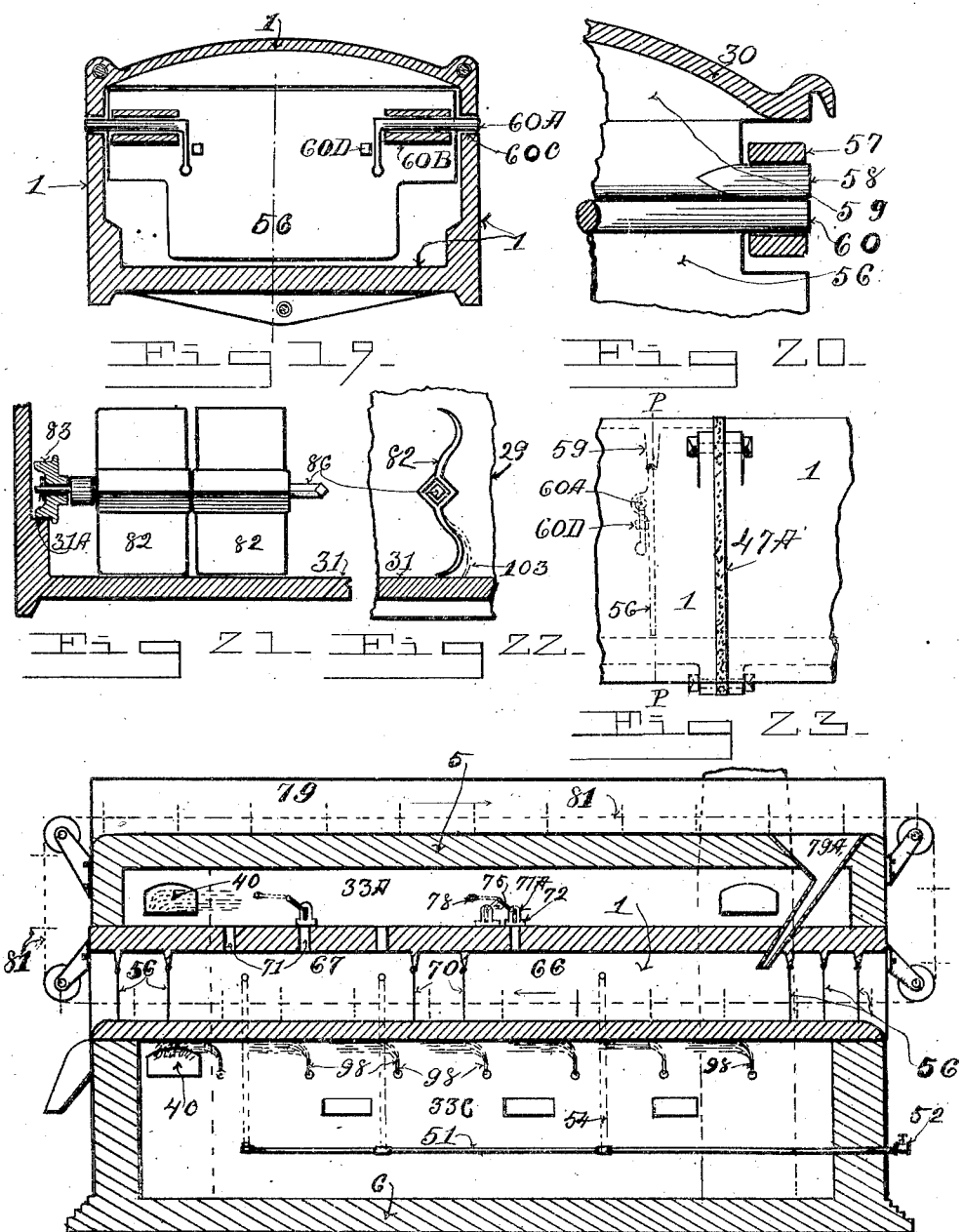

No. 689,946. Patented Dec. 31, 1901.
A. M. BEAM & H. S. BAILEY.
ORE TREATING FURNACE.
(Application filed July 17, 1899.)
(No Model.) 15 Sheets—Sheet 12.
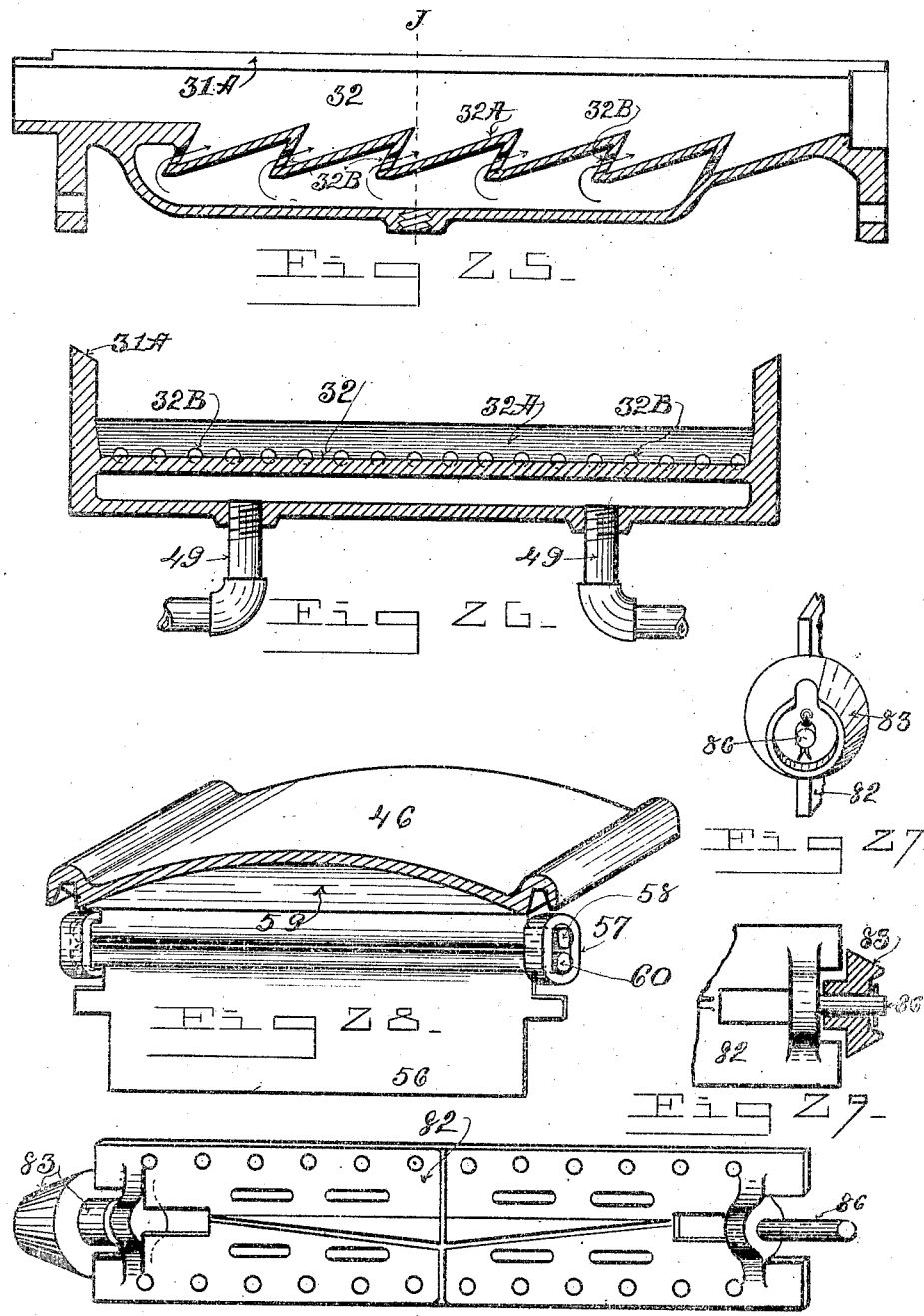

No. 689,946. Patented Dec. 31, 1901.
A. M. BEAM & H. S. BAILEY.
ORE TREATING FURNACE.
(Application filed July 17, 1899.)
(No Model.) 15 Sheets—Sheet 13.
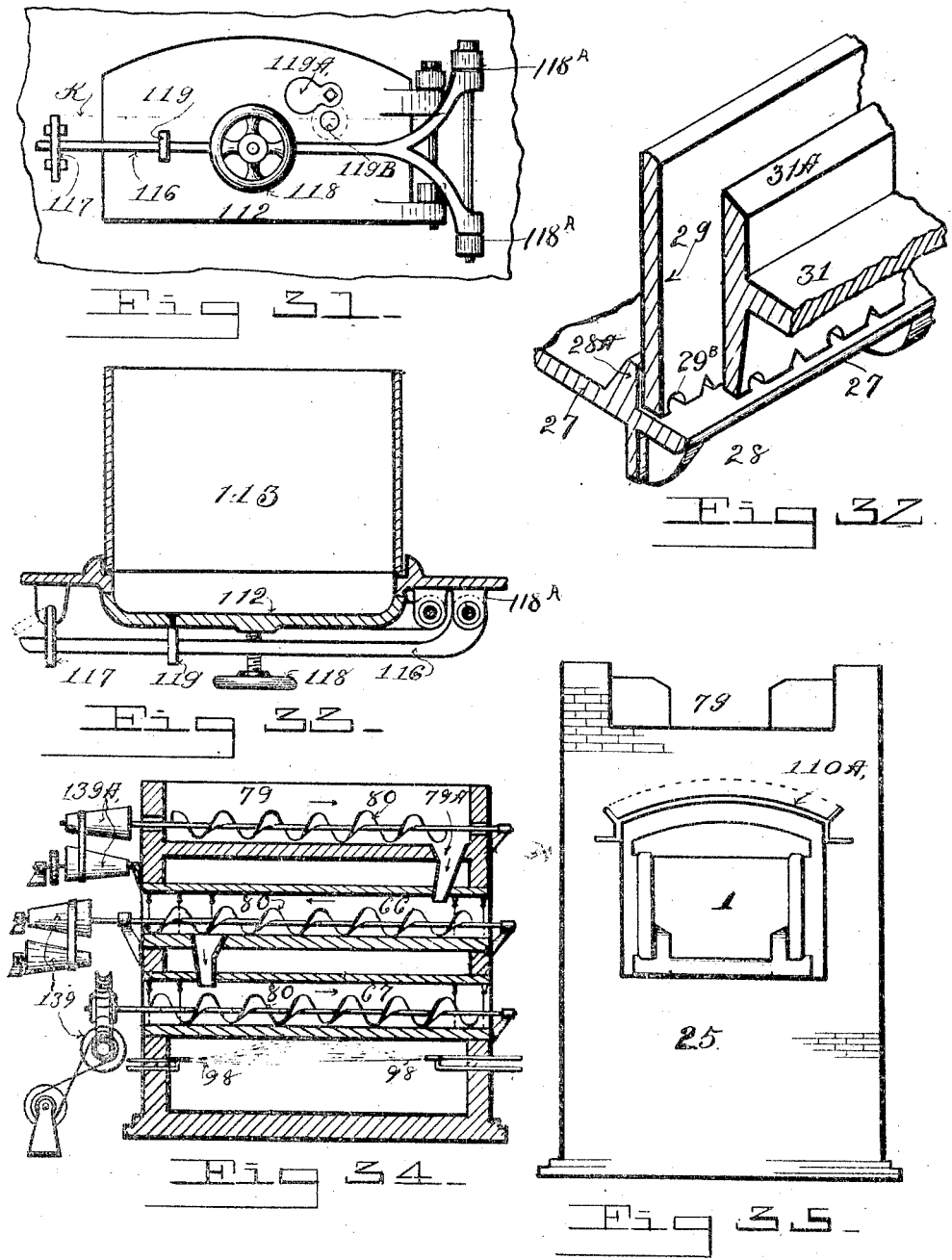

No. 689,946. Patented Dec. 31, 1901.
A. M. BEAM & H. S. BAILEY.
ORE TREATING FURNACE.
(Application filed July 17, 1899.)
(No Model.) 15 Sheets—Sheet 14.
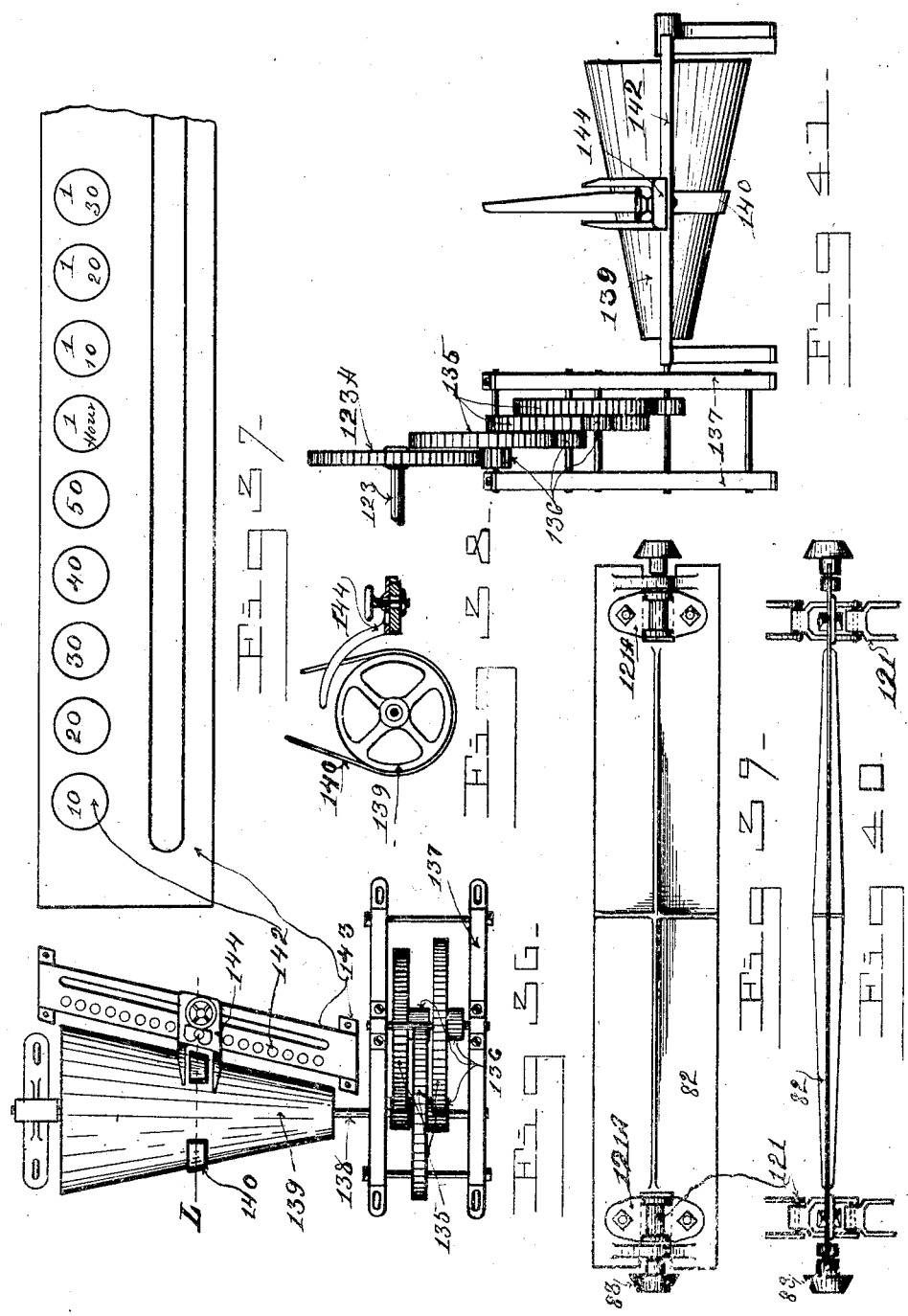
Witnesses
Walter H. Blanchard
Jesse W. Beam
Inventors
Arow M. Beam
Howard S. Bailey
By their Attorney
H. S. Bailey

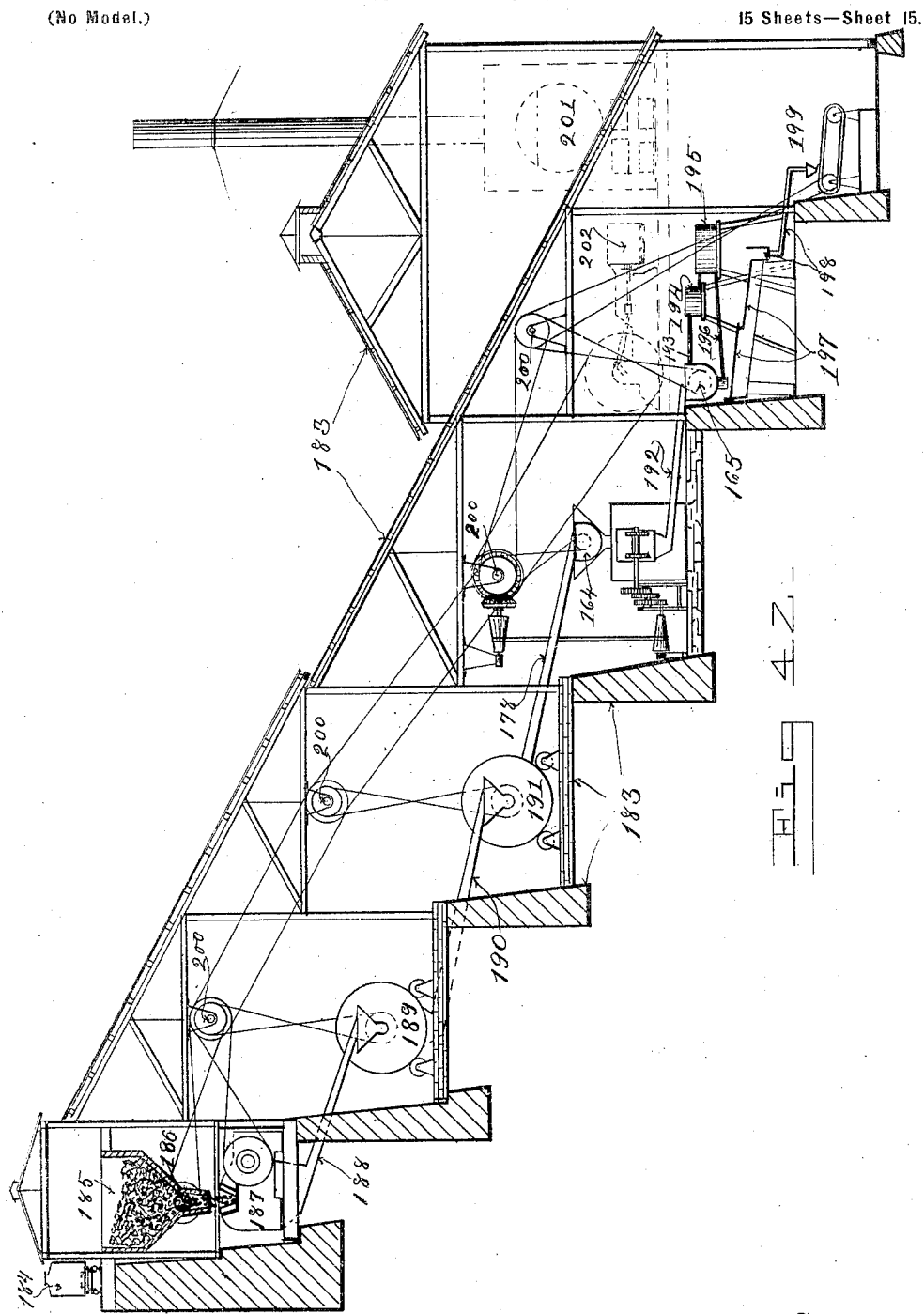

UNITED STATES PATENT OFFICE.

ARON M. BEAM AND HOWARD S. BAILEY, OF DENVER, COLORADO.

ORE-TREATING FURNACE.

SPECIFICATION forming part of Letters Patent No. 689,946, dated December 31, 1901.

Application filed July 17, 1899. Serial No. 724,180. (No model.)

*To all whom it may concern:*

Be it known that we, ARON M. BEAM and HOWARD S. BAILEY, citizens of the United States of America, residing at Denver, in the county of Arapahoe and State of Colorado, have invented certain new and useful Improvements in Ore-Treating Furnaces; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to a furnace and apparatus coöperating therewith for treating refractory and rebellious ores for their gold, silver, copper, lead, zinc, and other values.

To this end our invention consists, first, in a furnace for converting and changing refractory and rebellious ores of all characters to a condition in which the gold and silver values of the ore can be saved by amalgamation and the copper and base metals can be saved by leaching and also to a condition in which their values can be saved by leaching and cyaniding or by leaching and chlorination and concentration; second, in a furnace that will desulfurize ores without burning the sulfur, but will desulfurize them by converting them to a harmless condition; third, in a furnace that will practically desulfurize ores without to any material extent volatilizing the sulfur or the sulfur elements, thereby preventing the loss by volatilization and dusting generally met with in desulfurizing-furnaces that volatilize the sulfur and the sulfur elements, and, fourth, in a furnace that will save the chemical gold of telluride and other gold ores. We attain these objects by the mechanism illustrated in the accompanying drawings, in which—

Figure 1 is a central longitudinal sectional elevation of our converting-furnace. Fig. 2 is a horizontal sectional view on line A of Fig. 1 looking in the direction of the arrow. Fig. 3 is a horizontal sectional view of Fig. 1 on line B looking in the direction of the arrow. Fig. 4 is a front elevation of our converting-furnace with the hood removed. Fig. 5 is a cross-section on line C of Fig. 1 and Fig. 4. This section cuts through the auxiliary fire-box and the vertical flue. Fig. 6 is a cross-section on line E of Figs. 1 and 4. Fig. 7 is a cross-section on line D of Figs. 1 and 4. Fig. 8 is a cross-section on line F of Figs. 1 and 4. This section cuts centrally through the main fire-box and chimney. Fig. 9 is an end elevation of Fig. 4 and of rear end of the furnace, both ends being substantially alike, except that the feed end contains a feed-hopper and a discharge-chute. Fig. 10 is a longitudinal vertical section of a modifiation of the furnace shown in Fig. 1. Fig. 11 is a horizontal sectional view of Fig. 10 on line G. Fig. 12 is a longitudinal vertical section of a modification of our furnace. Fig. 13 is a cross-section on line H of Fig. 12. Fig. 14 represents a cross-section of a third modification of our furnace. Fig. 15 is a sectional elevation of a fragment of one end of the furnace represented in Fig. 14. Fig. 16 designates a sectional elevation of a modification of a furnace embodying our invention. Fig. 17 is a cross-section of Fig. 16 on line I of Fig. 16. Fig. 18 is a fragmentary view of a muffle, showing one form of conveyer. Fig. 19 is a cross-section of an integrally-formed muffle, showing a swinging door hinged thereto on line P of Fig. 23. Fig. 20 is a fragmentary section of one of the independent roof-sections of the built-up muffle, showing a door hinged by a link thereto. Fig. 21 is a fragmentary section of a muffle, showing a flexible ore-scraper. Fig. 22 is a side view of Fig. 21. Fig. 23 is a side view of Fig. 19 and shows the swinging door in dotted lines. Fig. 24 is a longitudinal vertical section of another modification of our invention. Fig. 25 is an enlarged side sectional view of the air-floor plates shown in Fig. 1. Fig. 26 is a cross-section of Fig. 25 on line J. Fig. 27 is an end view of a fragment of the scraper. Fig. 28 is a sectional perspective view of one of the swinging doors, showing the manner in which they are hinged by links to the roof-sections. Fig. 29 is one end of the scraper with the beveled wheel in section. Fig. 30 is a perspective view of the scraper with one wheel removed. Fig. 31 is an elevation of the muffle side doors and a fragment of the iron frame to which it is fitted. Fig. 32 is a fragmentary view of the floor and one side of a muffle resting on a fragment of their supporting wall-plate, showing passages for the gases and products of combustion under them. Fig. 33 is a longitudinal section of Fig. 31 on line K, showing also a section of the chute that leads from the door into the muffle. Fig. 34 is a longitudinal sectional view of a furnace which has independently-operated ore-conveyers in each compartment. Fig. 35 is a front end view of a furnace, showing the cast-iron arch center that supports the brick or masonry over the muffles. The muffle shown in this view is adapted to be constructed of fire-clay slabs. Fig. 36 is a plan view of the preferred power driving mechanism. Fig. 37 is an enlarged fragment of the belt-shifter support and time-board. Fig. 38 is a cross-section of Fig. 36 on line L. Fig. 39 is a side elevation of one of the ore-scrapers of the ore-conveyer with attachment-links of the link belts secured to it. Fig. 40 is a plan view of Fig. 39. Fig. 41 is an end elevation of variable-speed driving mechanism shown in Fig. 36. Fig. 42 is a sectional elevation of the general elements of a mill essential to the operation of our furnace for converting a gold and silver bearing ore to free-milling ore and for the recovery of the gold and silver values by amalgamation and leaching and concentration.

Similar characters of reference refer to similar parts throughout the several views.

Referring to the drawings, the numerals 1 and 2 designate two muffles arranged in preferably a vertical plane and at a distance apart sufficient to form a flue between them of suitable size for the furnace. These muffles are supported and incased in brickwork, which comprises the side walls 3 and 4, the roof 5, floor 6, and the wall-footings 7. At or near the opposite ends of the furnace we construct two fire-boxes or combustion-chambers 8 and 9, arranging them, as shown in Figs. 3 and 5, entirely outside of the furnace, or, as shown in Fig. 14, directly under the lower muffle. The fire-box 8 is the main fire-box. It is preferably formed in the base of the chimney $8^A$, which is carried far enough above the furnace to insure proper draft for the area of grate-surface given the furnace. In the chimney we arrange a damper 10, which we secure in any convenient manner on a rod 11. The central portion of the rod is preferably square and fits loosely in a square aperture formed diametrically through the central portion of the damper. The opposite ends of the pivoting rod extend through tubes 12. These tubes are built into the chimney. The ends of the pivotal rod of the damper are provided with washers 13 and 14 and pins 15 and 16, which are placed close to the washers. On the front side of the chimney a cross-bar 17 is secured to the end of the rod, from the ends of which depend pull-rods 18, by which the damper may be turned in the chimney-flue to open or close it. The main fire-box comprises the combustion-chamber 19, the grates 20, and the ash-pit 21, and the doors 22, leading into the combustion-chamber, also the doors $22^A$, leading into the fire-box and ash-pit. This main fire-box is preferably arranged in the base of the chimney. The chimney may be made independent and separate of this fire-box, if desired, as such an arrangement might be found more convenient in some plants, especially where several furnaces are used and it is desired to erect one chimney for them. The fire-box 9 at the opposite end of the furnace is an auxiliary fire-box and is preferably made smaller in area than the main fire-box. It is similar in construction to the main fire-box, except that its inclosing walls and roof are arranged solely to form a fire-box. Consequently it is built only high enough for this purpose. Where the fire-box and grates are arranged directly under the lower muffle, as shown in Fig. 14, this auxiliary fire-box is not used, and the chimney may consist of a stack 24, arranged at one side of the furnace and connected with the flues $33^A$ and $33^B$ by lateral flues $40^A$ and $40^B$, leading to it from the small and main furnace-flues. Between the side walls 3 and 4 and between the roof 5 and the floor 6 and the opposite ends of the furnace 25 and $25^A$ there is a clear space in which the muffles are placed. The lower muffle 2 rests on plates 26, which are built into the opposite side walls. The side walls from the foundation up to these plates are preferably flush with the outside face of the wall above these plates, forming a shelf at the top of the thicker wall, over which these plates extend. The lower muffle rests on the shelf formed by the thicker wall and the plates. The upper muffle 1 is supported on plates 27, that are built into the walls. These plates project into the flue-space between the muffles far enough to form shelves for the floor of the muffle to rest on. The walls are corbeled out to support a lug 28, which depends from the plates and rests on the corbeled-out portion of the walls. The plates on which the muffles rest extend all around the furnace, and the muffles are confined between an upward-projecting lug $28^A$, cast on the upper surface of the plates. Both muffles preferably consist of a box-shaped construction which completely separates the ore from the heat and gas flowing from the fire-boxes under and around them to the chimney, and they are both preferably constructed of independent side, floor, and roof pieces, which are assembled together. The sides 29 and roof 30 are interlocked or notched into each other in any convenient manner to prevent lateral displacement from one another, while the sides are confined to the sides of the floor 31 by the upward-projecting lugs $28^A$, which are formed on the plates. The floor-pieces of the muffles are provided with sides that project upward above its floor portion a few inches, the tops of which are preferably beveled toward the center of the floor. These sides form tracks $31^A$ within the muffles, upon which the ore-moving scrapers are supported. The muffles are arranged in the furnaces & leave a flue-space 33 between their sides and the side walls of the furnace. A flue-space 33ᴬ is also left above the upper muffle, and a flue-space 33ᴮ is formed between the two muffles, and a flue-space 33ᶜ is formed below the lower muffle.

34 and 35 designate the fire-box bridge-wall openings of the main and auxiliary fire-boxes, respectively, and 36 and 37 the casings over the bridge-walls. The products of combustion from the fire-boxes flow through these bridge-wall openings into the lower flue 33ᶜ and along under the lower muffle to a point opposite the auxiliary fire-box, where they pass through an opening 39 (shown in Fig. 5) opposite the bridge-wall of the auxiliary fire-box into a vertical flue 40 and from it through a second opening 41, also in the same side wall, into the middle flue 33ᴮ between the muffles. They then flow along between them back to the chimney, which they reach by passing through an opening 42, formed in the adjacent side walls. (See Fig. 8.) As the heat flows through these flues a portion of it, owing to the roughness of the bearing edges of the floor-sections of the muffles and sides of the muffles, withdraws under them and flows up through the narrow vertical flues 33 at the sides of the muffles, and in order to insure that a small portion of the heat will pass under the edges of the muffle and up and through these flue-spaces we provide their edges with a series of notches or flutes or holes 29ᴮ, as shown in Fig. 32. The gases that flow up around the top muffle flow into the chimney through the small flue. Consequently both muffles are practically surrounded by hot gases, which is a feature of great value in a muffle-furnace, as it insures an even temperature over the entire interior area of the muffle, and consequently an even heat on all sides of the ore. The floor and sides and roof of the muffles are divided lengthwise into sections of convenient length for transportation and for handling during construction and in order that any portion of the length of the muffles may be removed after the furnace is completed without removing or tearing down the brickwork. Thus the floor is divided into sections 31ᴬ, the roofs into sections 30ᴬ, and the sides into sections 29ᴬ. The sides and roof-sections are independent of the floor-sections. The floor-sections overlap, preferably, by a rabbeted-edge joint which extends up to the top of their track portions. The sides and roof-sections also overlap at their abutting edges in a manner to form a continuous straight section of the muffle which will fit together with the others the same as a single piece. The floor-sections of the muffles are preferably provided at their ends with depending transverse ribs which bolt together. They are thus clamped into a continuous floor member. The muffles may be made with integral floor, sides, and roof, as shown in Figs. 19 and 23, and be made in lengths convenient to handle and be bolted together. An asbestos gasket 47ᴬ may be inserted between the lengths, if desired. The opposite ends of each muffle rest on the end-wall plates, and as the muffles expand and contract they slide back and forth on the end and side wall plates, and as the ends of the furnace are open around the ends of the muffles they can expand and contract independent of the brickwork.

In the side walls of the furnace below the lower muffle a door 48 is placed large enough to permit the section of the muffles to be passed through it and to admit men to the lower flue. Then should any section of either muffle need to be replaced by new parts the sections can be moved through this door. In the floor of the lower muffle, adjacent to the discharge end, we insert one or several sections of an air-inlet floor 32, which is shown in Figs. 1, 25, and 26. These sections of floor, of which two are shown, are arranged to admit a great many jets of air under pressure to the under side of the ore and to force air up through the ore as it is moved over the sections of floor by the ore-scrapers. These air-inlet floor sections comprise a double floor with an air-space inclosed between them. The surface of the ore-floor is composed between its end edges of a successive series of ratchet-tooth-shaped steps 32ᴬ. The vertical face of each tooth or step is perfectly beveled under its top edge. The side walls are preferably formed in this manner in order that the ore as it drops over the edge of one step onto another step will strike on the adjacent tooth a short space away from the face wall of the step on which it falls. These inclined steps extend transversely across these floor-sections from track to track and can be carried up the sides of the track, if desired. Through the side walls of each step into the air-space a row of holes 32ᴮ is drilled close together, through which hot air flows under and through the ore. At one or more places in the floor an air-pipe 49 is connected with the air-chamber. This pipe is carried outside of the walls of the furnace, and a valve 50 is inserted in it to control the flow of air to and through the floor. The pipes are then carried back into the lower flue and connected with a main supply-pipe 51, which extends through one end of the furnace, where it is provided with a valve 52, and is connected to a blower 53 or other source of air-supply. In addition to these air-floor sections air is furnished to the upper side of the ore through pipes 54, which are extended from opposite sides of the main air-pipe to the side walls and are carried through them to the outside, where a valve 55 is inserted in them. They are then carried back into the wall and into the sides of the muffle. The muffles are provided adjacent to the ends with swinging partitions or doors 56, which are arranged transversely across them and are hinged to the roofs of the muffle. The upper muffle has a pair of these doors, spaced a short distance apart, adjacent to the entrance at each end. While these door-partitions can be hinged to swing in any convenient manner, we preferably suspend them, as shown in either Figs. 19 and 23 or in Figs. 20 and 28. Figs. 20 and 28 represent the preferred construction. In these views the doors are suspended by a link 57, placed at each end. These links hang on a trunnion 58, formed on the opposite ends of a rib 59, which depends from one of the roof-sections of the muffle. The swinging doors are provided at their top edge and at their opposite ends with a trunnion member 60, which fits close up against the trunnion members of the roof-section, and the links are adapted to fit loosely over both trunnion portions. As shown plainly in Figs. 19 and 28, the ends of the doors are formed with a recess, which enables them to swing down by the sides of the conveyer-chains. In Figs. 19 and 23 the door is pivoted by bolts $60^A$, which are held loosely in bosses $60^B$ and are arranged to slide laterally into holes $60^C$ in the sides of the muffle. A stop $60^D$ is provided on the door to lock the bolts to the muffles against accidental displacement. A side view of this arrangement is shown in Fig. 23. The lower muffle is also provided with end partition-doors, preferably arranged in pairs, the same as the upper muffle. These end doors prevent air from entering the muffle in harmful quantities. A little air will flow by them into the muffles, but not enough to do any harm. It is more necessary to keep the air from entering the rear end 25 of the muffles than from entering the front or feed end $25^A$, and as an extra precaution against the admission of too much air we place a hood 63 over the ends of the muffles and conveyer, completely inclosing them, and arranging any suitable air-tight stuffing-box around the conveyer-shaft. It would not be necessary to use this hood if the doors are well fitted, except occasionally on some particular ore. It may be constructed of thin sheet-iron. It is secured to the end 25 of the furnace by bolts 109 and by the lower bolts that hold the lower end of the hanger. The upper muffle constitutes an ore heating and mixing compartment 64, which extends its whole length; but the lower muffle is divided into preferably three independent compartments 65, 66, and 67. Of these 65 is the ore-assembling compartment. It is formed by placing an additional pair of doors 68 at a short space from the end doors and on the opposite side of the ore drop-chute 69, which depends from the floor of the upper muffle through the roof of the lower muffle. This pair of doors makes a separate compartment from the others, into which the ore drops from the upper muffle. This second pair of doors forms the inner walls also of a compartment, which is the chemical converting-compartment 66 of the furnace, the opposite wall of which is formed by the doors 70. Consequently this chemical converting-compartment is distinct and separate from the ore-mixing compartment. The doors 70 also form the inner wall of a third compartment 67, which is the oxidizing-compartment of the furnace. This compartment is also separate and independent from the other two compartments, and the ore undergoes an entirely different treatment in this compartment than in the chemical converting-compartment or when passing through the upper muffle. The roof of both muffles is provided at intervals of its length with holes 71 through its roof to permit any moisture and fugitive gases which may arise from the ore to pass from the muffle into the small flue $33^A$ above. These openings are controlled by valves $71^A$, which are arranged to slide on top of the roof of the muffle. The valves comprise a plate 72 wide enough to fit the top of the muffle and arranged to cover the holes through the roof. On the back of the valves an upward-projecting lug is formed at each end, which contains a vertically-disposed elongated slot 74, (see Fig. 6,) through each of which passes a crank 75. These cranks are formed on a transverse rod 76, which extends through pipes 77. The pipes are built into the walls of the furnace and act as journals for the rod to turn in. The valve-rods extend beyond the furnace, and on one or both ends a crank or wheel 78 is placed to turn the rod enough to permit the valve-operating cranks to move the valves to one side of the holes through the roof or to move them partially or wholly over them, so as to partially or wholly close them. These openings through the roof of the upper muffle also permit gases which flow laterally by expansion from the chemical converting-compartment or which may be drawn by the suction of the draft flowing up through the ore drop-chute to escape into the small flue. Air flowing into the lower muffle past the end doors will also be carried up the ore drop-chute by the upward draft caused by the openings through the roof of the upper muffle into the small flue. Some of the openings in the roof of the upper muffle should preferably always be left open or partially so, as it is better in order to obtain the best results in this furnace and method that all volatile products evolved from the metals and metalloids in the ore be held or imprisoned in this compartment until the sulfur elements have been chemically changed to a condition in which they will not burn when oxygen is admitted or when they pass into a compartment where oxygen is admitted and is united with them. It is an advantage, however, when treating some ores to have one or more tightly-valved openings leading out of the chemical converting-compartment into the flues to let out occasionally the fugitive gases evolved.

The main duty of this furnace is to convert refractory ores to free-milling ores, and in order to do this the sulfur elements of the ores must be changed from their hard crystallized sulfid condition to a soft flocculent friable soluble sulfate condition. To do this, two kinds of treatment are necessary—first, a chemical treatment, which in its nature must be a converting treatment, and, second, an oxidizing treatment, which in its nature is a separating, purifying, and cleansing treatment. This first treatment of the ore by the furnace is followed in continuous and uninterrupted successive order by the oxidizing treatment, which takes place in the compartment contiguous to the discharge end of the lower muffle and which is formed by the doors 56 and 70. Consequently the elements which a furnace must possess in order to be capable of automatically converting a rebellious ore to a free-milling ore are entirely different from those possessed by any furnace yet invented. These elements require, first, that the ore be automatically and continuously fed through a furnace in the time required by each particular ore under treatment to convert it; second, that the furnace contain separate, independent, and at the same time contiguous compartments, through which the ore can move continuously and progressively from one end to the other and in which the ore can be first carried from either a cold or warm or even a hot condition to the temperature best suited to convert it and also to drive out any moisture present and to substantially advance the ore toward the critical temperature of conversion before or as it passes into the chemical-compartment proper of the furnace. This temperature is from about 500° to about 620° and is regulated by frequently examining the ore and manipulating the doors and dampers of the furnace. Consequently the first compartment is preferably represented in the furnace at issue by the upper muffle 1 and is an initial-heating compartment 64. The chemical converting-compartment 66 proper is preferably arranged in the lower muffle 2, placed below the upper muffle 1, as is also the oxidizing-compartment 67, which of course is preferably arranged so that the ore will enter and pass through it after it has passed through the chemical-compartment; but while we preferably arrange the compartments of the furnace in this order yet there are other arrangements which would give the same conditions with entirely different arrangements and construction. Thus in Figs. 10 and 11 the three compartments are arranged one above the other and each extends clear across the length of the furnace. In this arrangement the conveyer would travel as indicated by the dotted lines, and the ore-discharge chute is placed on the opposite end of the furnace from the feed-hopper. The conveyer travels over the top of the furnace, and the side walls are extended up above the roof to form a trough, into which the ore may be deposited and mixed and measurably heated and any remaining moisture removed while it is being fed to the hopper by the upper line of the conveyer. This arrangement requires a vertical flue 40 at each end of the muffle, similar to that shown in Fig. 5.

In Fig. 12 another arrangement or modification is illustrated, in which two muffles 1 and 2 are shown independent of each other, and an inclosed mixing and heating space 79 is formed on top of the furnace, into which the properly-prepared ore is fed by any suitable conveyer and fed by the conveyer 80, which in this illustration is represented by a screw conveyer. The screw conveyer will automatically mix the fluxes and ore together thoroughly as it is fed to the ore-chute $79^A$, through which the ore drops to the floor of the chemical converting-compartment 66 and is moved by the ore-conveyer to its opposite end, where it drops to the floor of the oxidizing-compartment 67 through the ore drop-chute 69, through which it is moved and from which it discharges. The conveyer 81 of the converting and of the oxidizing compartment is arranged substantially like that shown in Figs. 1 and 2; but the conveyer 80 of the heating and mixing space is independent of it and may be driven from it as shown or from any suitable source of power, but should be timed to feed the ore in unison with the movement of the ore through the other compartments.

In Fig. 14 we illustrate an additional modification of the preferred construction shown in Figs. 1 and 2. In this arrangement the scrapers 82 are carried on wheels 83, which run on tracks 84, placed in closed chambers 85 outside of the muffles. The axles 86 of the scrapers on which the wheels run project through slots in the side walls of the muffles. In the outside walls of the side chambers we arrange doors and doorways, through which access may be had to the wheels and track. The combustion-chamber is arranged directly under the lower muffle 2 instead of in the base of the chimney. The vertical flues 40 are arranged substantially as in the other arrangements.

In Fig. 15 a section side elevation of one end of the furnace shown in Fig. 14 is illustrated in this arrangement. The scrapers 82 and wheels 83 are connected together by side links $84^A$, that pivot on the outside end of the axle 86 of the scrapers. The sprocket-wheel 89 is arranged to slide with its supporting-box 124 on the bracket 110, a weight 92 being attached by chain 93 to draw the conveyer 81 out to take up the slack of expansion.

In Fig. 16 we illustrate a modification in which a furnace containing but one muffle is shown. This muffle is divided into three compartments 64, 66, and 67, the compartment 64, into which the ore is fed through the hopper 56, being the initial-heating compartment 64. The middle one, 66, is the chemical converting-compartment, and the last one, 67, the oxidizing-compartment. Thus all the most essential compartments are grouped in one straight muffle, which is divided into these compartments by the swinging doors 56 and 70. The conveyer 80 is of the ordinary screw type and is connected at one end by the tight and loose pulleys 94 and 95 to any suitable variable-power driving mechanism. As this form of muffle is narrow at the floor portion, the arrangement of air-pipes that enter the sides of the muffle through the brick-work, as shown in Fig. 6, will be ample to furnish air to the oxidizing-compartment.

Fig. 17 designates a cross-section on line I, Fig. 16, and shows the arrangement of the conveyer and swinging doors.

In Fig. 24 an additional modification is shown. This furnace consists of one muffle, which is divided into the converting-compartment 66 and the oxidizing-compartment 67 by three sets of doors 56 and 70, these two compartments being the only two that are absolutely essential. Of course it is better to have a compartment or section where the ore can be initially heated before it is admitted to the converting-compartment; but it is not absolutely essential that it be in the shape of a muffle, as shown in the preferred construction and in some of the modifications. An inclosed compartment or open space on or above the roof of the furnace will answer the purpose. An open-ended space 79 is formed on the roof of this furnace by carrying up the side walls for that purpose, and the ore-conveyer 80 is arranged to travel through it and move the ore to the chute 79ᴬ, through which it drops into the converting-compartment 66 of the muffle, through which it is moved by the conveyer, which is arranged to travel over the roof of the furnace and through the muffle. The roof of the muffle is provided with valve-controlled openings 71, through which the fugitive gases are allowed to escape when desired.

We preferably use oil or gas for heating the furnace wherever it is cheaper than coal and preferably arrange the oil or gas burners 98 at suitable intervals along the bottom of the muffle. Where several muffles are used, one above the other, the oil or gas burners can be applied to each muffle, as shown in Fig. 12.

In all the modifications hot air and steam can be admitted, as in the preferred construction.

The preferred form of scraper 82 is illustrated in Figs. 30, 29, and 27. It comprises a slab having beveled wheels 83 pivotally mounted on projecting axles 86, which is not intended to rest with its whole weight at once on the floor of the muffles, as the wheels carry its weight. In Fig. 30 the scraper is illustrated with a plurality of holes formed through it to allow a part of the ore to pass through them. These ore-passages are not necessary, and the scrapers may be made imperforate, as shown in Figs. 21, 29, 39, and 40. They assist, however, to more thoroughly rabble the ore, but at the same time allow it to move slower than the imperforate scrapers. It is best to use both kinds in a conveyer-chain, either alternate or preferably with the perforate scrapers placed every third, fourth, fifth, or sixth. They may be dispensed with, however, entirely, as the ore rolls over and over itself as it is moved along by the solid imperforate scrapers.

In Fig. 18, which is a fragmentary section of the muffle, a conveyer is shown that consists of scrapers composed of blocks of cast-iron 100, which are tapered at each end. They rest and slide on the track portion 31ᴬ of the muffle. They are spaced a short distance apart, and their ends are connected together by pieces of chain 101. At their centers axles 86 are attached and extend across the muffle to similar blocks, which in the fragmentary view are not shown. The scrapers 82 consist of pieces of chain which are attached to the axles close to the blocks by long links. The chains lie loosely on and drag along the floor.

A plurality of independent loose, flexible, and pliable scrapers 82 may be used on independent axles 86, as shown in Figs. 21 and 22. These scrapers are mounted quite loosely on the axle and are preferably curved and are long enough to bear on the floor of the muffle, so that as the axles move them along their edges drag on the floor of the muffle. They may be made of resilient material, such as thin steel, in which case if their edges should catch they would spring back, as shown by the dotted lines 103 in Fig. 22. They will also spring back if resilient under a deep irregular body of ore or when passing over an irregular muffle-floor, where the scrapers might at the high places get crowded between the floor and the axle.

When the muffles are constructed of brick or of fire-clay slabs, the end walls of the furnace can be built tight up against them, as the expansion will be about even; but where they are constructed of cast-iron the expansion between the brick and iron is so unequal that it is better to have a joint that will allow the cast-iron to expand independently of the brick. We preferably carry out this feature of our invention by arranging around the ends of the muffle in the preferred construction three plates 104 and 105, which collectively constitute what we call a "stuffing-box." The top member 105 is an angular-shaped casting having an outward-extending lip portion 106. One of the lips of the angle is bolted to a plate 107, which extends under the end buckstay 108 of the furnace. This plate 107 is simply a name-plate and can be dispensed with, in which case the angle-plate is secured by bolts 109 to the wall. The holes in the plate through which the bolts 109 pass should be elongated, so that the lip 106 of the other leg, which extends into the furnace, will always rest on the roof of the muffle. This lip is shaped to fit the contour of the roof of the muffle, as shown in Fig. 9. The top stuffing-box of the lower muffles is bolted to the end hangers 110. The brick arch at the ends of the furnace over the ends of the muffles are preferably carried on cast-iron arches 110^A, which are built into the walls, as shown in Fig. 35. Between the sides of the muffle and the brickwork I place vertical plates 104, which rest on top of the lugs 28^A of the wall-plates. As shown in the plan, Fig. 2, these plates are set back a little way from the ends of the furnace, so that a space is left in front of them and also between the top stuffing-box plate and the roof of the muffle, and the space is filled with common mortar, asbestos, cement, mineral wool III, or any other suitable material. By constructing the ends of this furnace in that manner a tight joint can always be maintained, and by removing the mortar and plates the end sections of the muffle can be taken out and replaced from either end of the furnace. Doors 112 and chutes 113 are placed in the sides of the furnace at suitable intervals, which lead into the muffles. They enable an operator to secure samples of the ore from time to time as it travels through the muffles. Doors 114 and chutes 115 are also provided, leading into the middle flue. These doors may be dispensed with, if desired, especially in short furnaces. The side muffle-doors are useful and an advantage in long furnaces, as the condition of the ore in each compartment can be quickly ascertained through them without waiting until it arrives near the discharge end. The muffle-doors should have a planed seat and should be clamped air-tight against it by a clamping-bar 116 and yoke 117 and hand-wheel 118, as illustrated in Figs. 31 and 32. The clamping-bar is hinged to an independent set of hinges 118^A from those that support the door and is held to the door by a loop-keeper 119. A peep-eyehole 119^B and cover 119^A are also arranged on the door.

The ore-conveyer comprises scrapers 82 of any suitable form and a connecting-chain 121 or chain of any suitable link. Two chains are preferably used, one on each side or end of the scrapers or of the conveyer. In Figs. 39 and 40 the preferred construction and arrangement of the link-belt chains and the scrapers are clearly illustrated. The track 31^A, upon which the conveyer-wheels run, is preferably placed in the muffles and is preferably beveled to shed ore that is moved upon them, and the tread of the wheel of the scrapers is beveled to register with the bevel of the track. Special attachment-links are used to attach the chains to the scrapers. These attachment-links 121^A are preferably bolted to the scrapers in order that they may be quickly detached in case of breakage or workage. The chains, the scrapers, and the wheels must be constructed of highly-carbonized steel, cast-iron, or of such other material as will resist the gases generated in the furnace, as they destroy wrought-iron very rapidly. The conveyers may be placed from a few inches to several feet apart. At the opposite ends of the furnace the conveyer is carried (in Figs. 1 and 2) on gap sprocket-wheels 122. These wheels are mounted on a shaft 123, which is journaled in boxes 124. These boxes are slidably mounted on hangers 110, which are securely bolted to the ends of the furnace in a manner to be vertically adjustable. The boxes at the power end of the furnace are set stationary in any adjusted position; but at the opposite end the boxes are slidably mounted to compensate for expansion and contraction, they being moved out by any suitable means, preferably by springs. We preferably make the vertical adjustment of the hangers by forming elongated holes around the bolts. The hangers contain oppositely-disposed center screw-bolts 126, which are arranged in axial alinement. These screw-bolts on the power driving end of the furnace fit into centers drilled into the sides of the boxes. At the opposite end they project loosely into sleeves 127, formed integral with it, far enough to form holding-guides, but do not interfere with the reciprocal sliding movement of the boxes on the expansion end of the conveyer. These screw-bolts have check-nuts 128 to hold them in set position. Around the sleeves adjacent to the end of the furnace of the boxes at the expansion end of the conveyer we place an expansion-spring 129, which bears at one end against the box and at the opposite end against a nut 130, that is threaded to a sleeve 131, which surrounds the adjacent screw-bolt and bears against an upward portion 132 of the bracket in which the screw-bolt is threaded, as shown in Fig. 1. The springs can be adjusted for tension by the nut on the sleeve to hold the conveyer-chain taut enough to take up the slack caused by expansion. In short furnaces the expansion device may be dispensed with. The driving-shafts 123 of both ends of the furnace are alike and may be connected by sprocket-wheels 133 and link belting 134 or other suitable power-transmitting devices to assist to move in unison.

As ores of different characters require different periods of time for their conversion, it is necessary that a differential-feed power driving mechanism 139^A be provided that will move the conveyer through the furnace a complete revolution in the shortest time it will require and in any time from the shortest time up to the longest time required to treat different ores. We preferably use a pair of cones for this purpose for obtaining differential speeds, and gearing for reducing the speed of the cones to that required for the conveyer. In Fig. 36 we show a train of gears 135 and pinion 136, mounted in a supporting-frame 137 and connected at one end of the train to a gear 123^A, mounted on the driving-shaft 125 of the furnace, and at the opposite end to the shaft 138 of a driving-cone 139, which is connected by belt 140 to an opposite cone 141. The lower cone has a time-gage 142 laid off on the support 143 for the belt-shifter 144, graduated to from ten minutes to three hours, at ten minutes apart. The gearing is proportioned and the speed of the cone is adjusted to make the conveyer move the ore completely through the furnace in preferably from ten minutes to three or more hours in progressive order of preferably ten minutes apart, thus giving a great range of speed, the cones being made long enough to give this range of speed. Consequently the operator having first ascertained by small tests in an assay-furnace the time required to convert any particular ore has only to set the driving-belt with the belt-shifter at the time his test indicates is necessary to make the conversion in. Thus if the test requires twenty minutes the belt and shifter should be set on the twenty-minute mark of the time-gage, and if the test requires twenty-five minutes the belt and shifter should be set half-way between the twenty and thirty marks of the time-gage. Of course any other range and division of graduations of time may be used, and instead of the train of gearing a worm-gear 135$^A$ could be mounted on the conveyer-shaft and a worm-pinion placed on the cone-shaft and arranged in mesh with it, as shown in Fig. 1. When it requires three hours to convert an ore, the conveyer moves about six inches a minute in a one-hundred-ton furnace, in which the ore travels about ninety-six feet in passing through it; but when it only requires ten minutes the conveyer moves at about eight feet per minute.

The furnace is bound together both transversely and longitudinally by buckstaves 145 and tie-bolts 146, and all bolts that pass through the brickwork or masonry are surrounded by pipes or tubes 147, the ends of which must be kept open to the atmosphere in order that the air may circulate freely through them. If this is not done, they are apt to quickly rot and break. The roof-arch of the furnace is also supported by tie-bolts 148, surrounded by pipes 149. The long longitudinal rods 150 are divided and a turnbuckle 146$^A$ or eye 146$^B$ connection is made between them, and where the two rods in the foundation of the furnace come together a casting 151 is placed on the joint to form a passage for air from one pipe to the other which surround the bolts. The top longitudinal bolts 150 are provided at their ends with springs 152, arranged and adapted between washers 153 and the end nuts 155 to automatically take up the expansion and contraction of the furnace. The use of these springs is not essential, especially in short furnaces, but is an advantage in long furnaces.

On the top of the furnace we bolt a feed-hopper 156, which is provided with a spout 157, that extends into the upper muffle. In the feed-hopper we arrange a feed-roll 158, which is provided with a plurality of pockets 159 in its periphery. These pockets may be formed to hold any desired quantity of ore, and as some ores treat easier than others they can be run deeper. It is better to have the pockets of a capacity that will feed enough ore to make one-half, or one, or one and one-half, or two or more tons per feed-roller for the time it requires to convert the ore under consideration. Thus if a feed-roller of four-ton capacity is in use and the ore in treatment requires twenty minutes to convert it the operator knows that there are four tons every twenty minutes passing through the furnace; but if an ore is being converted that requires an hour he is converting four tons per hour. While the feed-rollers are not expected to feed regularly the exact pounds of their capacity, they will do so approximately. The rollers are mounted on a shaft 160, and both are arranged to be withdrawn from the hopper easily and quickly. The shaft extends beyond the end of the hopper and is driven by a sprocket-wheel 161 and link belt 162, that is belted to a similar wheel 163, mounted on the end of the adjacent conveyer-shaft. The link belt is made slack to allow for expansion of the ore-conveyer. The rotation of the feed-roll is preferably timed in unison with the movement of the conveyer and so that the pockets will discharge the ore directly in front of each scraper.

The ore and flux mixer 164 (shown in Figs. 14 and 42) comprises simply a shaft 166, suitably mounted in a trough 167, of any suitable form, which may be constructed independent of the furnace or placed upon it, as in the preferred construction, or may be built in the top of the furnace by carrying up the side walls, as shown in some of the modifications. The shaft may have the oblique blades 168 (shown in Fig. 1) or a common screw conveyer, as shown in Figs. 10 and 34 of the modifications, and can be made of any suitable material. The ore and water mixer and regrinder 165, however, while consisting of the same elements as the ore and flux mixer—that is, a trough and a revoluble shaft and blades—is preferably made of wood. The oblique blades should be formed and arranged so that their faces 169 will throw the ore against the trough by centrifugal force, and the speed should be great enough to cause impingement of the ore against the trough, which, together with the frictional contact of the blades with the ore, further comminutes and regrinds it.

170 designates a hopper attached to the ore and flux mixer 164 to hold the flux. A feeding device 171 is arranged in the hopper and driven by cones 172, which enables a variable feed to be given the flux into the trough. These cones are preferably connected by gearing 173 and a belt 174 to a counter-shaft 175, which is driven by belt 176 from a pulley 177 on the worm-pinion shaft 178, so that the flux-feeding device is driven by the conveyer-driving mechanism. The mixing-shaft is also driven through the medium of the gears 173. This arrangement allows the flux-feeder and flux and ore mixer to have variable speeds, so that the amount of flux can be regulated independent of the feed of the ore through the furnace or of the revolutions of the mixer.

178$^A$ designates the end of an ore-conveyer trough, from which ore is delivered into the mixing-trough from the pulverizing machinery.

179 designates a conveyer extending from the flux-hopper to preferably an apartment or laboratory where the fluxes are prepared. The opposite end of the conveyer contains a boot 180, into which the fluxes can be placed and are conveyed to the hopper, which preferably should be located in the laboratory. A belt 181 connects with the counter-shaft 175 and operates the conveyer. In Fig. 4 a modification of this arrangement is shown. The flux-hopper and its driving-cones are dispensed with. The conveyer empties directly into the trough and is driven from the boot end by cones 182, and the amount of flux fed from the boot end is regulated by the varying speed of the conveyer.

In Fig. 34 we illustrate an additional modification of a furnace embodying our invention, in which we illustrate a method of moving the ore faster in one compartment than another to compensate for the different lengths of time required to treat some kinds of ore in the different compartments. Thus we find by experience that a chemical converting treatment of from two to thirty minutes is sufficient, while an oxidizing treatment of from fifteen to ninety minutes, respectively, is necessary to convert these ores—that is, if five minutes is sufficient length of time for a particular ore in the chemical converting-compartment during the converting treatment fifteen minutes may be required to oxidize and complete the conversion in the oxidizing-compartment. In the preferred construction we meet this condition by making the chemical converting-compartment shorter than the oxidizing-compartment, which can be done by moving the central swinging doors toward the ore-drop chute, simply changing the position of the roof-section that carries the doors with the adjacent roof-sections. The modification illustrated in Fig. 34 permits ore to be fed through each compartment in different periods of time. An independent screw conveyer 80 is arranged in each of the three compartments. In each case the conveyers are driven by independent variable-speed driving mechanism 139ᴬ, which may be the same as above described or of any other suitable variable-speed driving mechanism. These variable-speed conveyers for the different compartments can be applied to several of the modifications above described.

The method of operating this furnace and of manipulating refractory and rebellious ores to convert them to free-milling ores by means of this furnace is as follows: The ore is first crushed in a rock-breaker. It is then dried in a drier to expel its moisture. It is then pulverized by a suitable machine or group of machines of the same or of different characters, such as rolls and a ball-pulverizer, or by stamps to about from thirty to two hundred mesh, the mesh depending largely on the character of the ore. Generally, however, from about forty to one hundred mesh is amply fine enough. It is then preferably mixed with a chemical flux, which has the power of assisting in decomposing and changing the sulfur elements by softening them from their hard crystallized sulfid condition. When cooperating with the conditions met with in the furnace, such a flux can be composed of a great many chemicals. The ore is then fed into the mixing-trough, where it is mixed with the chemical flux. It is then fed into the hopper of the furnace. The furnace is heated to from about 200° to 615° Fahrenheit. It is not necessary or desirable for the amalgamation of the gold and silver values that the heat exceed the melting-point of lead, which is about 620° Fahrenheit; but where it is desired to change the silver sulfids to sulfates and then leach for the silver values it is necessary to do so. From the hopper the ore drops onto the floor of the upper muffle, along which it is carried by the ore-conveyer to the ore-drop chute at its opposite end, each scraper of the conveyer moving a certain amount of ore before it. In this compartment it is heated and any remaining moisture driven from it, and with some ores chemical action will commence in this compartment. In other ores it is brought to the critical point of commencing. The ore drops through the ore-drop chute onto the floor of the muffle below between two sets of doors and is carried by the conveyer under one set of doors into the chemical converting-compartment and excluded from contact with any material quantity of air. A little air is not harmful, and a very little is necessary. From the chemical converting-compartment the ore is fed by the conveyer under the central set of doors into the oxidizing-compartment, where pure live atmospheric heated air is admitted to it, preferably under pressure—that is, air that has not passed over a fire—in order that the oxygen of the air may unite with it. The ore is held in the oxidizing-compartment and in contact with oxygen until it absorbs all the oxygen it can hold, which it does by chemical union with the ore and by absorption, especially of the iron than the sulfur, and displaces it. The application of oxygen to the ore is greatly facilitated by the air-plates, which force hundreds of independent jets of air up through the ore from its under side, and these jets are so close together that the air practically unites into a solid sheet and thoroughly permeates the ore and very rapidly oxidizes it, and thus completes the conversion. The valve-controlled opening in the roof is kept closed during the chemical treatment in the converting-compartment, it being opened at intervals only—for instance, when heavy sulfid ores are being treated—to let out accumulated fugitive and deleterious gases. The oxidizing treatment completes the conversion. The ores are then conveyed from the discharge-chute through a cooler 192 (a common spiral conveyer and a water-jacketed trough, through which cold water is forced under pressure, answers for both conveyer and cooler) and then from the combined cooler and conveyer to a water and ore mixing and regrinding device 165.

Our invention contemplates any ore and water mixing device that will thoroughly mix and comminute any lumps and that will regrind the ore. It is generally necessary to regrind an ore, there being very few ores but what require regrinding. The ore mixing and regrinding device 165 (shown in Fig. 42) will regrind and comminute as well as mix; but when only mixing is required, the rotatable speed of shaft and blades can be slow; but if regrinding is required the speed should be increased to several times that necessary to mix. The object of regrinding is to more thoroughly clean, brighten, separate, and individualize the gold and silver. It also further comminutes the ore, as it is very friable after conversion, as it can be crumbled finer with the fingers, especially when mixed with water, but as all ores would be benefited by regrinding, and as the only difference between mixing and regrinding in this device is in the revoluble speed of the oblique blades, it is better to always run the mixer and regrinder at a speed high enough to accomplish both purposes—say from about two hundred to three thousand revolutions per minute, as the ore requires. From the water and ore mixer and regrinder the combined ore and water, which is termed "pulp," is conveyed to amalgamating-plates or to amalgamating-pans; but if the ore contains copper or base metals, as zinc, antimony, &c., in paying quantities it is better to leach the ore first and extract them. To do this, the pulp is led through a pipe to the leaching-tank, where clean water is applied, and leaches through the ore-pulp, dissolving the soluble sulfates and carrying them away in solution to the settling-tanks, where they are precipitated from the solution individually in a well-known manner. The practice on general low-grade gold and silver ores is, however, to let the copper and base metals go, as they are generally too low in these metals to pay for the treatment, in which case the pulp is conveyed directly from the ore and water mixer, comminuter, and regrinder to the amalgamating-plates. The plates are made of copper coated with mercury or electrosilver-plated and then coated with a thin coat of mercury. The pulp is run over them in a thin wave-like stream and the gold settles on and amalgamates with the mercury. The pans consist of tubs with revolving stirrers, amalgamating-plates, and with free mercury in the bottom. When pans are used, settling-tanks are also used, into which the pulp is drawn to settle the suspended mercury, quantities of which are peppered on top of the ore and allowed to settle through it. Almost all of the gold and silver values are caught by the mercury or silver amalgam, after which the gold and silver amalgam is retorted, which drives the mercury off and leaves the gold and silver, which are then preferably parted, and the gold is sent to the mint and the silver is sold. The tailings from the plates or pans are then passed over concentrators, and any further values saved by them are reground and reamalgamated, and the final values are sent to the smelters.

Our furnace for treating rebellious and refractory ores contemplates the use of any suitable rock-breaker and crushing and pulverizing and drying and ore and flux mixing machinery in coöperation with a converting-furnace, substantially as herein shown and described, together with any suitable ore-cooling and water and ore comminuting and regrinding, leaching, amalgamating, and concentrating machinery.

In Fig. 42 we illustrate a general arrangement of a mill embodying the several coöperating machine elements which are essential to the practice of our automatic furnace for converting rebellious ores to a condition in which their gold and silver values can be saved largely by amalgamation and their copper and base metals can be saved by leaching. In this view, 183 designates a mill, and 184 a car in position to discharge into the ore-bin 185 of the mill. The ore is fed by a feed device 186 into a rock-breaker 187. From the rock-breaker the ore is conveyed by a conveyer 188 to a drier 189, and from this drier the ore is conveyed by a conveyer 190 to pulverizing-stamps or other suitable machinery adapted to pulverize to from thirty to two hundred mesh. A pebble-tube pulverizer 191 is, however, shown, from which it is conveyed by a conveyer 178 to an ore and chemical-flux mixer 164, which is preferably placed on top of the furnace or is built in the top of the furnace; but of course it could be placed by itself away from the furnace. From this mixer the ore is then fed to the hopper of the converting-furnace and is fed through the furnace and converted. From the furnace it is conveyed by the combined conveyer and cooler 192 to the ore and water mixer and regrinder 165, which is practically the same as the ore and chemical mixer, from which, if it is desired to leach it, it flows through copper or lead pipes 193 to a system of leaching and solution tanks 194 and 195 and from there to the amalgamating-plates through the pipes or launders 196. If the ore is not to be leached, the pulp flows on to amalgamating-plates 197 directly from the water and ore mixer and from there, through the conveyer 198, which is arranged with cross strips of wood to catch any floating amalgam, to the concentrator 199. The ore-conveyers may be of any suitable type. The several machines are belted to shafts 200, which are driven by power furnished by a boiler 201 and engine 202. (Shown in dotted lines.) The conversion increases the volume of the ore and sometimes its weight, both being caused by the great volume of oxygen it absorbs, which is generally greater than the amount of fugitive and other gases thrown off or volatilized from the sulfur and other volatile elements.

Having described our invention, what we claim as new, and desire to secure by Letters Patent, is—

1. In an automatic furnace for converting rebellious ores to a free-milling and leaching condition comprising suitable inclosing side and end walls, muffles within said walls, flues surrounding said muffles, means for heating and for regulating the heat of said muffles, flues and walls; swinging-door partitions in one of said muffles arranged to divide said muffle into separate compartments, means for substantially preventing all but a small amount of air from entering one of said compartments, a combined ore-conveyer and rabble in said muffles, a variable-speed driving mechanism for said conveyer, means for introducing hot air or steam into another compartment of said muffle, that is divided into compartments, means, including flues for heating said muffles and valve-controlled outlets leading from said muffles into said flues, and means for opening and closing said valves from the outside of said furnace, substantially as described.

2. In an ore-treating furnace, muffles within said furnace, flues surrounding said muffles, means for heating said furnace and muffles, compartments in one of said muffles contiguous to one another, swinging doors between and separating said compartments arranged to be moved longitudinally of the muffle to lengthen or shorten said compartments and adapted and arranged to prevent an excess of air from entering said compartments, an ore-supply for said furnace, a combined ore-conveyer and rabble operatively mounted in said furnace to feed ore continuously therethrough, a variable-power driving speed mechanism for said conveyer and rabble, and means including sliding bearing-boxes for supporting said conveyer for automatically taking up the expansion of said ore-conveyer, substantially as described.

3. In a muffle-furnace, comprising side and end walls, muffles within said walls, flues inclosed by said muffles and walls, means for heating said muffles, compartments in one of said muffles separated by swinging doors, means for preventing all but a very small amount of air from flowing into one of said muffles, a combined ore moving and rabbling ore-conveyer in said muffles adapted to convey ore continuously through the muffle and means including a transversely-serrated floor-section having air-holes in the bottom of the serrations for introducing air to the bottom of ore moving through said furnace, and for forcing air and oxygen up through the ore, whereby the ore is quickly and thoroughly permeated with oxygen and thereby oxidized, substantially as described.

4. In an ore-converting furnace, the combination with side and end supporting-walls of muffles within said walls, flues surrounding said muffles, means for heating said muffles, swinging doors arranged in one of said muffles to form independent compartments therein and arranged to prevent a too-free inflow of air and movably arranged in said muffle, a combined ore-conveyer and rabble arranged to feed ore automatically and continuously through said muffles, means including sliding journal-bearings and springs for taking up the expansion of said ore-conveyer, valve-controlled passages leading from said compartments of said muffle into said flues, and means for opening and closing said valve-controlled openings from the outside of said furnace, substantially as described.

5. In an ore-converting furnace, the combination with side and end walls, muffles within said walls, compartments within said muffles, a combustion-chamber adjacent to said muffles, flues arranged around said muffles, a chimney connected to said flues, swinging doors arranged in said muffles to divide them into compartments and to keep air from flowing too freely into them, and means for shifting the position of some of said swinging doors, substantially as described.

6. In an ore-converting furnace the combination of inclosing walls, a muffle supported by said walls, means including a combustion-chamber and flues adjacent to said muffle for heating said muffle, a chimney connecting with said flues, partitions in said muffle comprising swinging doors and adapted to divide said muffle in compartments of different character for ore-treating, valve-controlled openings from said compartments leading into said flues, means for operating said valves to open and close said openings from the outside of said furnace, means including pipes arranged to be heated, and a blower for introducing heated air and steam under pressure through the floor of said muffle in small, closely-arranged jets and streams, into the muffle and for introducing air into the upper portion of said muffle, valves arranged in said pipes to control the supply and pressure of air or steam from the outside of said furnace, and an ore-conveyer operatively mounted to convey ore through said muffle, substantially as described.

7. In an ore-converting furnace the combination of inclosing walls containing ore-treating compartments, swinging-door partitions arranged to define said compartments and their communication with one another, means for moving the position of said doors, to enlarge one compartment and decrease the length of another, means including perforated floor-sections and pipes built in said walls of said furnace and a blower attached to said pipes for delivering heated air through and across the perforated sections of the floor of said muffle-compartments, so that the air will pass upwardly through the ore from its under side, means including valves for controlling the volume of air admitted, means for admitting air to both sides of said compartments, and means including flues and a chimney for heating said compartments, substantially as described.

8. In an ore-converting furnace the combination of inclosing walls containing muffles having swinging-door partitions at their ends, and compartments within one of said muffles, swinging-door partitions arranged to separate one compartment from another and their communication with one another, means for moving the position of said doors to enlarge one compartment and decrease the length of another, means including perforated floor-sections, pipes built in said walls and a blower attached to said pipes for delivering heated air through across the perforated sections of the floor of said muffle, so that the air will pass upwardly through the ore from its under side, means, including valves, for controlling the volume of air admitted, means for admitting air to both sides of said muffles, means including flues and a chimney for heating said muffles, openings through said compartments leading into said flues, valves arranged to cover a predetermined number of said openings, means including a lever and rod connected to said valves and projecting through said walls for moving said valves to open and close said openings, an ore-moving rabbling endless ore-conveyer arranged to move continuously through said muffles, sprocket-wheels supporting said conveyer at opposite ends of said furnace, a shaft supporting said sprocket-wheels, boxes supporting said shafts, brackets or hangers secured to said furnace and arranged to support said boxes, means for adjusting said boxes and brackets vertically and horizontally, means, including springs for taking up the expansion of said ore-conveyer, and a variable-speed power driving mechanism, comprising cones and gearing for said conveyer, substantially as described.

9. In an ore-treating furnace, the combination with the side and end walls, plates built therein and projecting from the side walls into the space inclosed by said walls, muffles resting on said plates and projecting through said end walls, projecting ribs on each plate to define the position of said muffles, an angle-shaped stuffing-box plate, secured to the ends of said furnace and arranged to bear on the tops of said muffles, side plates adapted to stand on said projections of said plates between the ends of said muffles and the sides of the openings in said end walls, through which said muffles pass, and means, including suitable packing material for packing the joint formed by said plates and stuffing-box plates, substantially as described.

10. In an ore-treating furnace, the combination of side and end walls, plates formed along the inside of said side walls, and a muffle resting on said plates and projecting through the end walls, and having a clear space at its side and above and below it, having said muffle constructed in sections and the sections secured and connected together and having the ends of the muffle resting on the end walls of the furnace, a stuffing-box plate arranged to be bolted to the end walls of said furnace and to bear on top of said muffle, side plates between said muffle and said end walls, and a suitable packing for the packing-spaces formed in front of said side plates, whereby said muffle may expand and contract independent of said side walls, substantially as described.

11. In an ore-treating furnace a muffle consisting of independent roof, side and floor sections, each of which is constructed in sections having side and roof sections connected by suitable rabbeted interlocking and connecting joints and having said floor-sections secured together, substantially as described.

12. In an ore-treating furnace a muffle consisting of a plurality of coöperating roof, side and floor sections, each of which is constructed in sections, an ore moving and rabbling conveyer, operatively mounted to convey ore through said muffle, and swinging-door partitions at the central portion and ends of said muffles, operatively arranged to be moved to allow said ore-conveyer to pass, substantially as described.

13. In an ore-treating furnace, a muffle comprising a plurality of coöperating roof, side and floor sections each of which is constructed in sections connecting together to form a muffle and having predetermined floor-sections provided with a hollow air-chamber below its floor-surface and having its floor-surface formed into and broken up by a plurality of angled steps, serrations or angled flutes, a plurality of small air-holes through the walls of said steps, a valve-controlled pipe connected to said air-chamber, a blower connected to said pipe, and means for delivering heated air or steam to said air-chambered floor-sections.

14. In an ore-treating furnace, the combination with inclosing walls of an ore-floor having an air-chamber below its ore-surface and having angled steps formed in its floor-surface and small air-holes through said steps into said air-chamber, means including pipes embedded in said walls for supplying heated air or steam under pressure to said air-chambered floor, and means including valves arranged in said pipes for controlling the volume and pressure of air or steam supplied to said air-chambered floor, whereby heated air under pressure is delivered to the under side of ore lying on or moving over said floor and is forced up through the ore in innumerable closely-clustered jets and is thereby quickly oxidized, substantially as described.

15. In an ore-converting furnace, the combination of inclosing walls, a muffle supported by said walls and having portions of the floor of said muffle contain below its floor-surface an air receiving and distributing chamber and having said floor-surface divided into angled or serrated steps extending across it from side to side at right angles to the direction the ore is moved over it and having the walls of said angled or serrated steps inclined obliquely under the top edge of the corner of each step, so that, as the ore drops off from each step it will fall clear of the wall, and having in and at the base of said wall along each step a row of closely-placed small holes into said air-chamber, pipes connected to said floor portions and embedded in said furnace-walls and arranged to extend outside of said walls, valves arranged in said pipes in the portion extending outside of said walls, and means including a blower, for delivering heated air or steam to said air-chambered floor, substantially as described.

16. In an ore-treating furnace, the combination with inclosing walls of a muffle having a floor-section containing angled steps, holes in said steps, an inclosed air-distributing space below said stepped floor, an air-supply pipe connected to said inclosed air-space and means including valves and a blower for heating and controlling the volume of air, substantially as described.

17. In a furnace the combination with the inclosing walls, the muffles having their floors, their sides and their roofs constructed in sections, the compartments in said muffles, the swinging doors in said compartments and the ore-conveyer operatively mounted in said muffles, a predetermined section of the floor of one of said muffles, having its surface formed into a series of angled steps, an air-distributing chamber formed in said floor-section below said steps, a plurality of air-holes through said steps into said air-chamber, and means including valve-controlled pipes for delivering hot air or steam to said sections, substantially as described.

18. In an ore-treating furnace, the combination with the inclosing walls, the muffles within said walls, and the swinging doors in said muffles, of tracks within said muffles, an endless ore-conveyer operatively supported on sprocket-wheels at the ends of said walls and muffle, and comprising endless belts mounted on said sprocket-wheels, axles arranged transversely across said belts at intervals in their length, a flexible and yielding scraper secured to each axle, and a support secured to the ends of each axle and arranged to rest and run on said tracks, substantially as described.

19. In an ore-treating furnace the combination with the walls, the floor and the flues thereof arranged within the walls, of an endless conveyer operatively arranged to move ore through said furnace, wheels secured to said furnace adapted to support said conveyer, journals for supporting said wheels, suitable boxes for supporting said journals, and means for taking up the slack of expansion of said conveyer, comprising hangers secured to the ends of said furnace, and slidably supporting said boxes, means for vertically adjusting said hangers, cap-screw bolts threaded to said hangers, sleeves on opposite sides of said boxes into which said cap-screw bolts loosely extend a partial distance of the holes in said sleeves whereby said boxes have clearance of movement on said screw-bolts upon said hangers, a threaded sleeve on one of said screw-bolts, a nut on said threaded sleeve and a spring surrounding said sleeve and arranged and adapted between said nut and box to extend said conveyer-supporting wheels and supporting-boxes on said hangers as said conveyer expands, substantially as described.

20. In an ore-treating furnace, the combination with inclosing side and end walls, of a muffle supported by said walls and divided into a converting-temperature compartment and an oxidizing-compartment by swinging-door partitions at its ends and central portion, a second muffle above the first-named muffle, also containing swinging-door partitions at its ends, and adapted for use as an initial ore-heating muffle, an ore-chute between said muffles, at one end of the upper muffle, a feed-hopper at the opposite end, a trough connected to said ore-hopper, a shaft mounted in said trough, oblique blades adapted to mix and feed, mounted on said shaft, an endless ore-conveyer passing through said muffles, and means including cones for imparting variable speeds to said ore mixing and moving conveyers, substantially as described.

21. In an ore-treating furnace, the combination with inclosing walls, of a muffle supported by said walls, flues surrounding said muffle, a combustion-chamber adjacent to said flues, a chimney connected with said flues, swinging-door partitions within said muffle arranged to divide it into compartments; a second muffle contiguous to and below the first-named muffle, swinging-door partitions at its ends, an ore-chute from one muffle to the other at one end, a hopper at the opposite end, a trough above said second muffle, and means operatively connected with said trough for feeding the flux into the ore, substantially as described.

In testimony whereof we affix our signatures in presence of two witnesses.

ARON M. BEAM.
HOWARD S. BAILEY.

Witnesses:
WALTER H. BLANCHARD,
JESSE W. BEAM.